US012610232B2

(12) United States Patent
Ferdi et al.

(10) Patent No.: US 12,610,232 B2
(45) Date of Patent: Apr. 21, 2026

(54) AUTHENTICATION AND AUTHORIZATION ASSOCIATED WITH LAYER 3 WIRELESS-TRANSMIT/RECEIVE-UNIT-TO-NETWORK

(71) Applicant: InterDigital Patent Holdings, Inc., Wilmington, DE (US)

(72) Inventors: Samir Ferdi, Kirkland (CA); Guanzhou Wang, Brossard (CA); Xiaoyan Shi, Lake Oswego, OR (US); Behrouz Aghili, Commack, NY (US); Michelle Perras, Montreal (CA); Saad Ahmad, Montreal (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 123 days.

(21) Appl. No.: 18/271,279

(22) PCT Filed: Jan. 7, 2022

(86) PCT No.: PCT/US2022/011535
§ 371 (c)(1),
(2) Date: Jul. 7, 2023

(87) PCT Pub. No.: WO2022/150538
PCT Pub. Date: Jul. 14, 2022

(65) Prior Publication Data
US 2024/0305980 A1 Sep. 12, 2024

Related U.S. Application Data

(60) Provisional application No. 63/185,748, filed on May 7, 2021, provisional application No. 63/150,130, filed
(Continued)

(51) Int. Cl.
*H04W 12/06* (2021.01)
*H04W 76/14* (2018.01)
*H04W 92/18* (2009.01)

(52) U.S. Cl.
CPC ........... *H04W 12/06* (2013.01); *H04W 76/14* (2018.02); *H04W 92/18* (2013.01)

(58) Field of Classification Search
CPC ...... H04W 12/06; H04W 76/14; H04W 92/18
See application file for complete search history.

(56) References Cited

U.S. PATENT DOCUMENTS

| | | | |
|---|---|---|---|
| 11,032,710 B2 | 6/2021 | Faccin et al. | |
| 2019/0037409 A1* | 1/2019 | Wang ..................... | H04W 8/08 |

(Continued)

OTHER PUBLICATIONS

3rd Generation Partnership Project (3GPP), TR 23.752 V1.0.0, Technical Specification Group Services and System Aspects, Study on system enhancement for Proximity based Services (ProSe) in the 5G System (5GS) (Release 17), Nov. 2020, pp. 1-181.

(Continued)

*Primary Examiner* — Kostas J Katsikis
(74) *Attorney, Agent, or Firm* — Condo Roccia Koptiw LLP

(57) ABSTRACT
A relay wireless transmit/receive unit (WTRU) may receive a direct communication request (DCR) from a remote WTRU requesting connectivity service (e.g., connectivity session parameters such as single-network slice selection assistance (S-NSSA!), data network name (DNN)), The relay may determine that the connectivity session for the service is subject to a secondary authentication and authorization (A&A), based on an indication associated with the connectivity session if already established and/or an indication associated DN from relay proximity service (ProSe) configuration. Based on the determination, the relay may trigger a network-controlled authorization for the remote
(Continued)

WTRU. The relay WTRU may send a direct communication accept (DCA) message including a pending secondary A&A. and configure a traffic filter associated with the connection (e.g., a PC5 link) to discard data traffic from the remote WTRU until a successful completion of the secondary A&A.

16 Claims, 22 Drawing Sheets

Related U.S. Application Data on Feb. 17, 2021, provisional application No. 63/134,783, filed on Jan. 7, 2021.

(56) References Cited

U.S. PATENT DOCUMENTS

| | | | | |
|---|---|---|---|---|
| 2019/0349951 A1* | 11/2019 | Ahmad | ............... | H04W 76/18 |
| 2020/0228510 A1 | 7/2020 | Lee et al. | | |
| 2020/0267554 A1* | 8/2020 | Faccin | ............... | H04L 63/101 |

OTHER PUBLICATIONS

3rd Generation Partnership Project (3GPP), TR 33.847 V0.3.0, "Technical Specification Group Services and System Aspects, Study on Security Aspects of Enhancement for Proximity Based Services in the 5G System (5GS) (Release 17)", Nov. 2020, pp. 1-73.

3rd Generation Partnership Project (3GPP), TR 33.847 V0.5.0, Technical Specification Group Services and System Aspects, Study on security aspects of enhancement for proximity based services in the 5G System (5GS) (Release 17), Mar. 2021, 120 pages.

3rd Generation Partnership Project (3GPP), TS 23.287 V16.4.0, Technical Specification Group Services and System Aspects, Architecture enhancements for 5G System (5GS) to support Vehicle-to-Everything (V2X) services (Release 16), Sep. 2020, pp. 1-58.

3rd Generation Partnership Project (3GPP), TS 23.501 V16.6.0, Technical Specification Group Services and System Aspects, System architecture for the 5G System (5GS), Stage 2 (Release 16), Sep. 2020, pp. 1-447.

3rd Generation Partnership Project (3GPP), TS 23.501 V17.0.0, Technical Specification Group Services and System Aspects, System architecture for the 5G System (5GS), Stage 2 (Release 17), Mar. 2021, 489 pages.

3rd Generation Partnership Project (3GPP), TS 23.502 V16.6.0, Technical Specification Group Services and System Aspects, Procedures for the 5G System (5GS), Stage 2 (Release 16), Sep. 2020, pp. 1-597.

3rd Generation Partnership Project (3GPP), TS 23.502 V17.0.0, Technical Specification Group Services and System Aspects, Procedures for the 5G System (5GS), Stage 2 (Release 17), Mar. 2021, 646 pages.

3rd Generation Partnership Project (3GPP), TS 33.501 V17.0.0, Technical Specification Group Services and System Aspects, Security Architecture and Procedures for 5G System (Release 17), Dec. 2020, pp. 1-253.

3rd Generation Partnership Project (3GPP), TS 33.501 V17.1.0, Technical Specification Group Services and System Aspects, Security architecture and procedures for 5G system (Release 17), Mar. 2021, 256 pages.

3rd Generation Partnership Project (3GPP), TS 33.536 V16.2.0, Technical Specification Group Services and System Aspects, Security aspects of 3GPP support for advanced Vehicle-to-Everything (V2X) services (Release 16), Dec. 2020, pp. 1-24.

3rd Generation Partnership Project (3GPP), S3-210124, "Solution for Secondary Authentication Remote UE with L3 UE-to-Network Relay", 3GPP TSG-SA3 Meeting #102-e, InterDigital, e-meeting, Jan. 18-29, 2021, 4 pages.

* cited by examiner

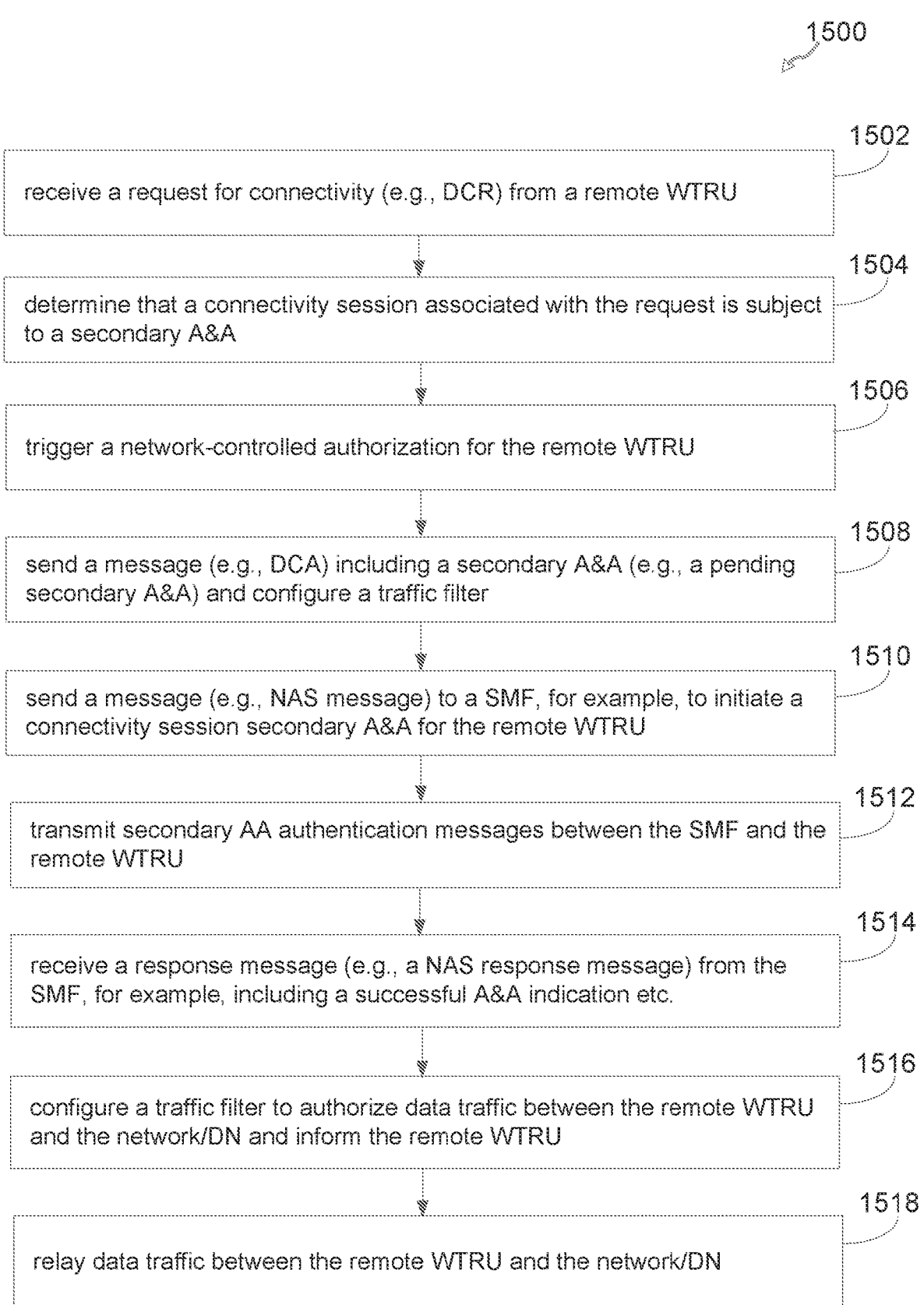

1500

1502
receive a request for connectivity (e.g., DCR) from a remote WTRU 1504
determine that a connectivity session associated with the request is subject to a secondary A&A 1506
trigger a network-controlled authorization for the remote WTRU 1508
send a message (e.g., DCA) including a secondary A&A (e.g., a pending secondary A&A) and configure a traffic filter 1510
send a message (e.g., NAS message) to a SMF, for example, to initiate a connectivity session secondary A&A for the remote WTRU 1512
transmit secondary AA authentication messages between the SMF and the remote WTRU 1514
receive a response message (e.g., a NAS response message) from the SMF, for example, including a successful A&A indication etc.

1516
configure a traffic filter to authorize data traffic between the remote WTRU and the network/DN and inform the remote WTRU 1518
relay data traffic between the remote WTRU and the network/DN

FIG. 15

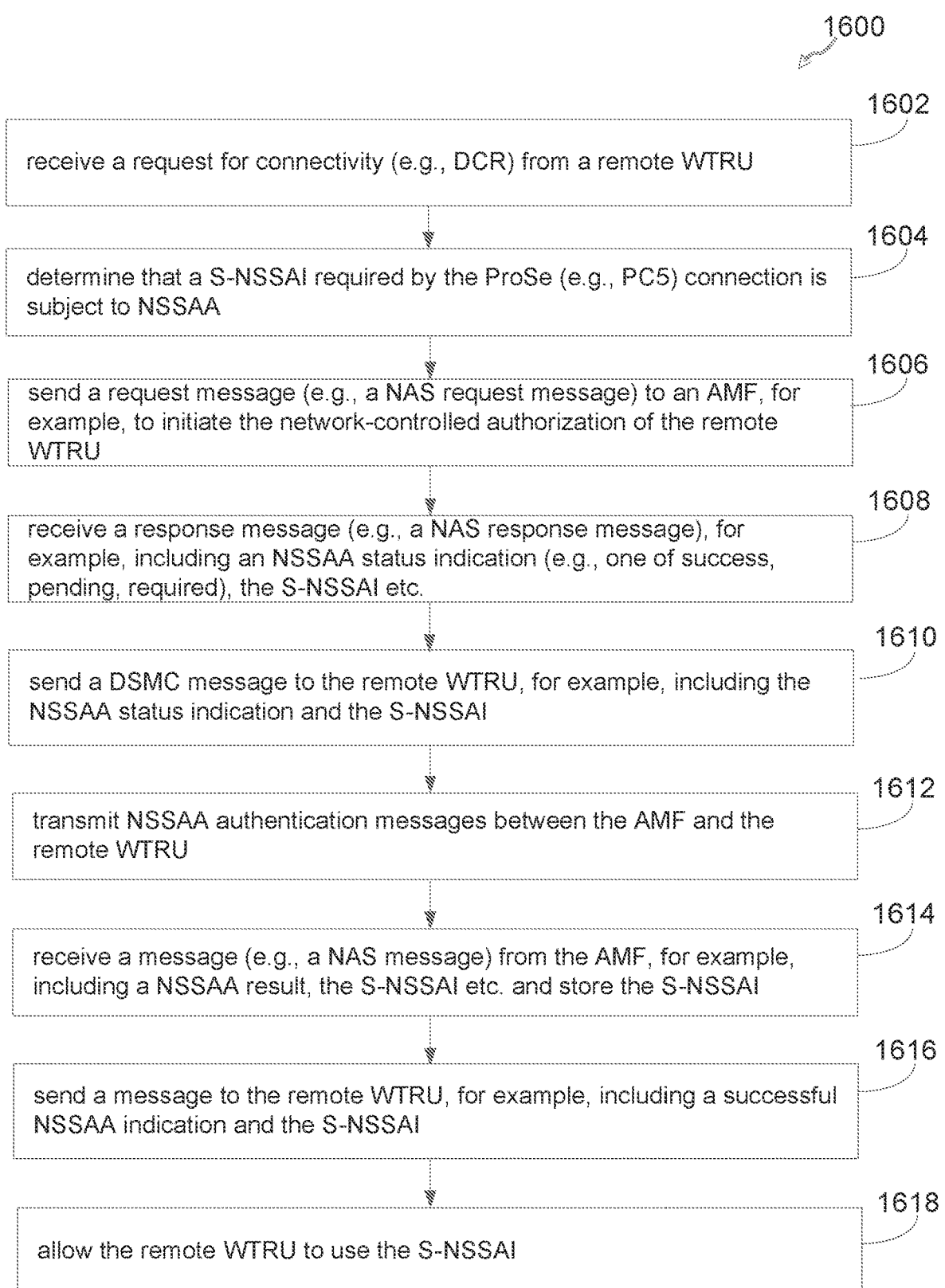

1600 receive a request for connectivity (e.g., DCR) from a remote WTRU — 1602 determine that a S-NSSAI required by the ProSe (e.g., PC5) connection is subject to NSSAA — 1604 send a request message (e.g., a NAS request message) to an AMF, for example, to initiate the network-controlled authorization of the remote WTRU — 1606 receive a response message (e.g., a NAS response message), for example, including an NSSAA status indication (e.g., one of success, pending, required), the S-NSSAI etc. — 1608 send a DSMC message to the remote WTRU, for example, including the NSSAA status indication and the S-NSSAI — 1610 transmit NSSAA authentication messages between the AMF and the remote WTRU — 1612 receive a message (e.g., a NAS message) from the AMF, for example, including a NSSAA result, the S-NSSAI etc. and store the S-NSSAI — 1614 send a message to the remote WTRU, for example, including a successful NSSAA indication and the S-NSSAI — 1616 allow the remote WTRU to use the S-NSSAI — 1618

FIG. 16

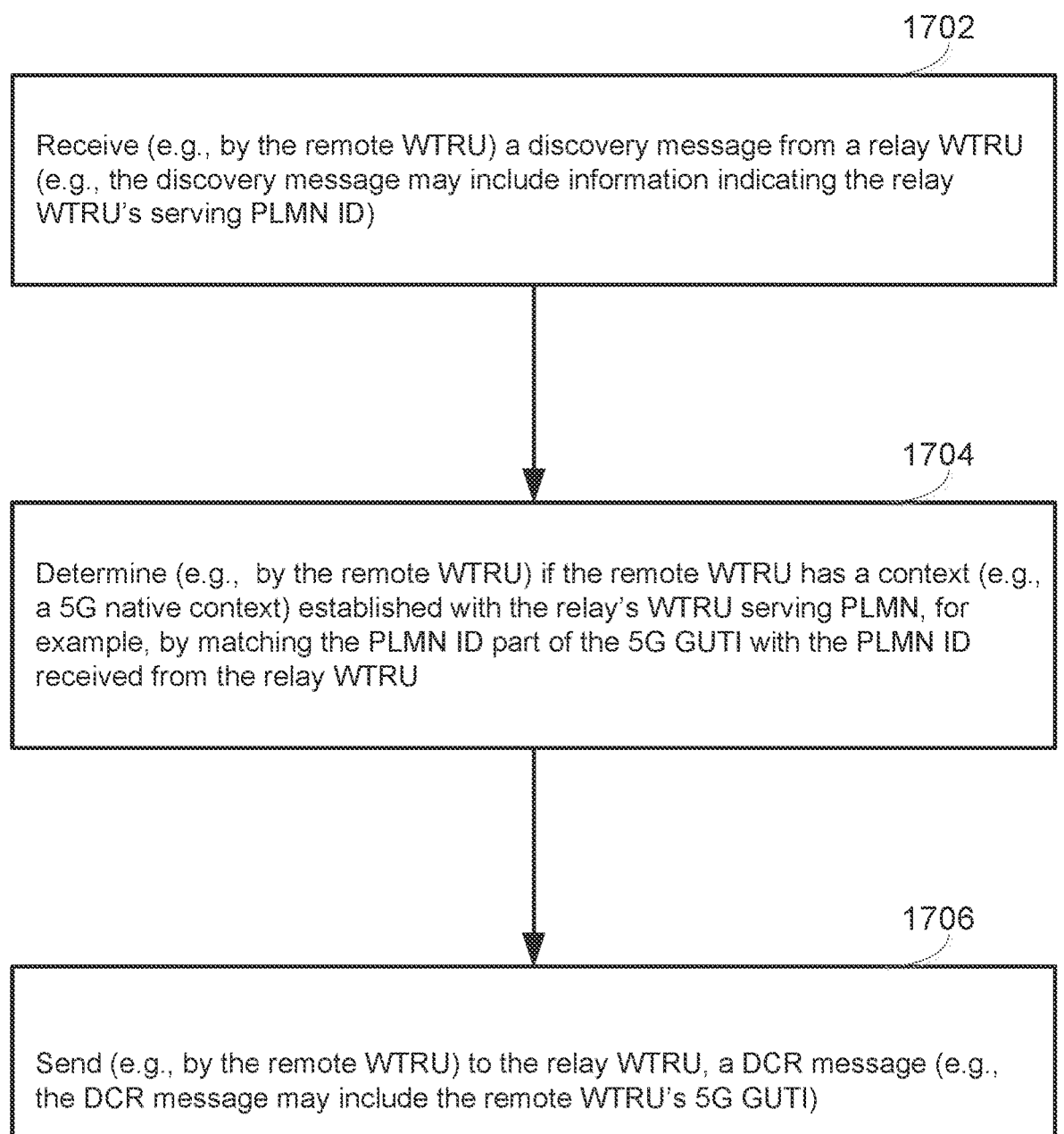

1702

Receive (e.g., by the remote WTRU) a discovery message from a relay WTRU (e.g., the discovery message may include information indicating the relay WTRU's serving PLMN ID)

1704

Determine (e.g., by the remote WTRU) if the remote WTRU has a context (e.g., a 5G native context) established with the relay's WTRU serving PLMN, for example, by matching the PLMN ID part of the 5G GUTI with the PLMN ID received from the relay WTRU

1706

Send (e.g., by the remote WTRU) to the relay WTRU, a DCR message (e.g., the DCR message may include the remote WTRU's 5G GUTI)

FIG. 17

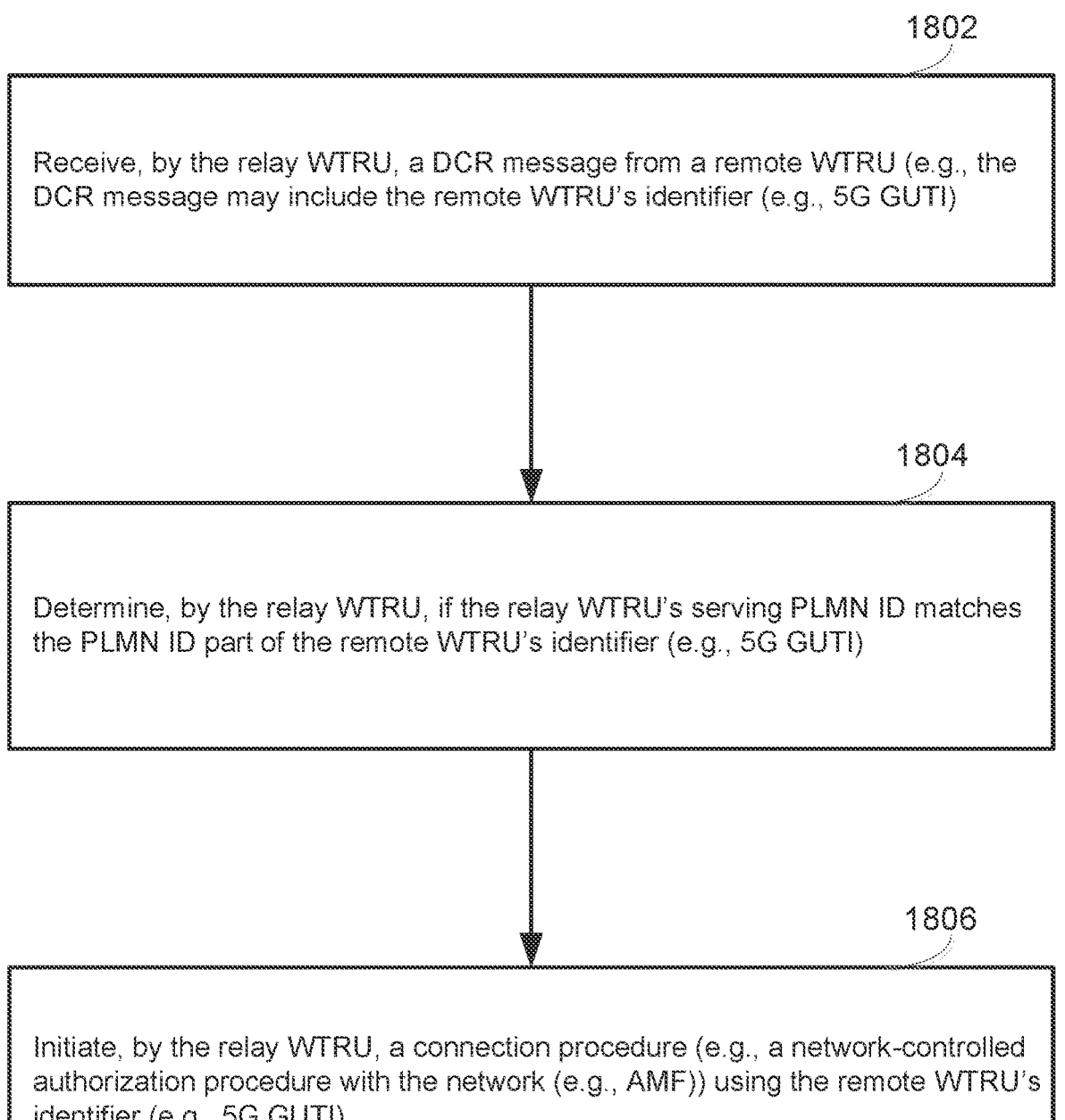

Receive, by the relay WTRU, a DCR message from a remote WTRU (e.g., the DCR message may include the remote WTRU's identifier (e.g., 5G GUTI)

1802

Determine, by the relay WTRU, if the relay WTRU's serving PLMN ID matches the PLMN ID part of the remote WTRU's identifier (e.g., 5G GUTI)

1804

Initiate, by the relay WTRU, a connection procedure (e.g., a network-controlled authorization procedure with the network (e.g., AMF)) using the remote WTRU's identifier (e.g., 5G GUTI)

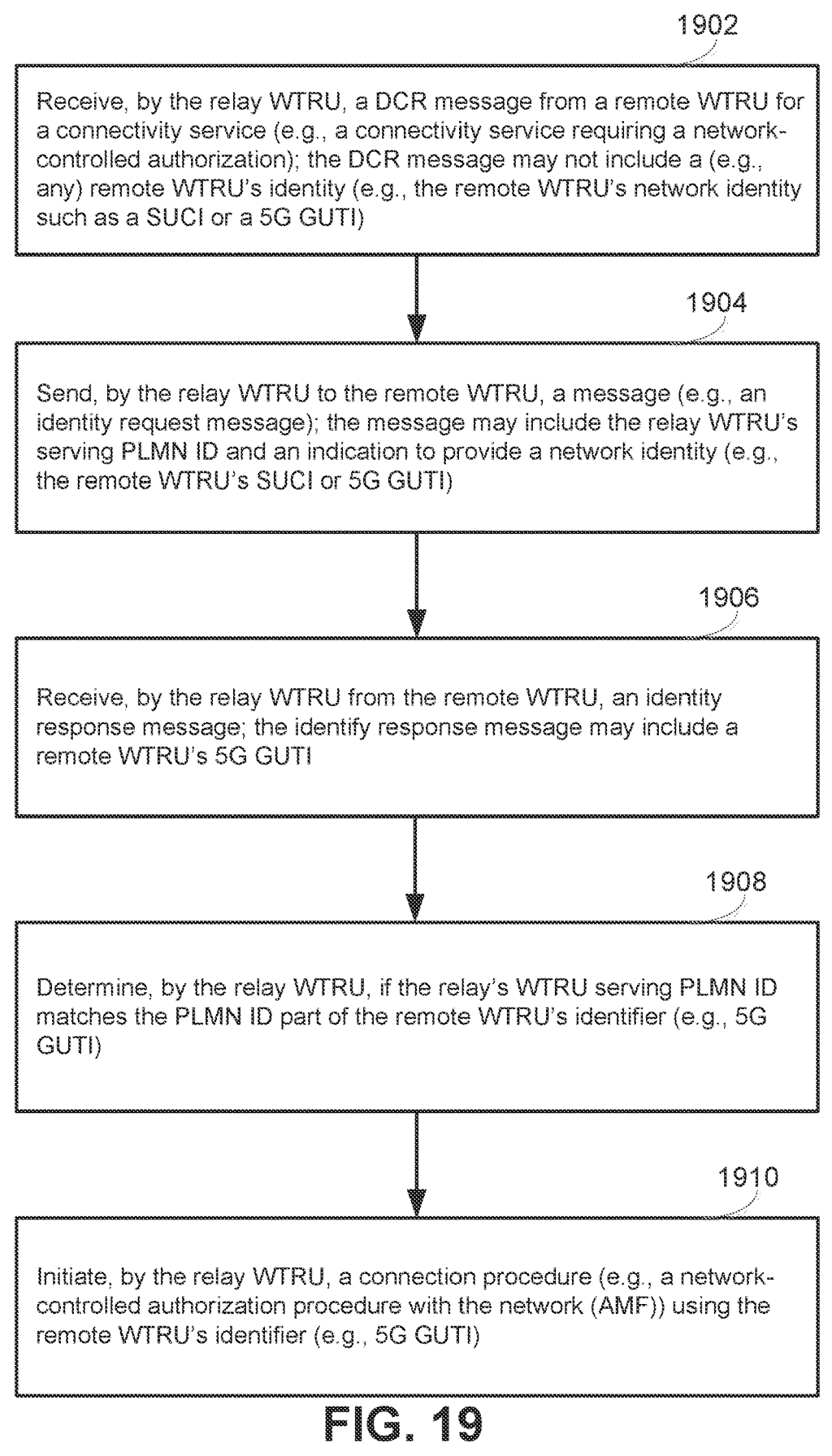

Receive, by the relay WTRU, a DCR message from a remote WTRU for a connectivity service (e.g., a connectivity service requiring a network-controlled authorization); the DCR message may not include a (e.g., any) remote WTRU's identity (e.g., the remote WTRU's network identity such as a SUCI or a 5G GUTI)

1904

Send, by the relay WTRU to the remote WTRU, a message (e.g., an identity request message); the message may include the relay WTRU's serving PLMN ID and an indication to provide a network identity (e.g., the remote WTRU's SUCI or 5G GUTI)

1906

Receive, by the relay WTRU from the remote WTRU, an identity response message; the identify response message may include a remote WTRU's 5G GUTI

1908

Determine, by the relay WTRU, if the relay's WTRU serving PLMN ID matches the PLMN ID part of the remote WTRU's identifier (e.g., 5G GUTI)

1910

Initiate, by the relay WTRU, a connection procedure (e.g., a network-controlled authorization procedure with the network (AMF)) using the remote WTRU's identifier (e.g., 5G GUTI)

FIG. 19

AUTHENTICATION AND AUTHORIZATION ASSOCIATED WITH LAYER 3 WIRELESS-TRANSMIT/RECEIVE-UNIT-TO-NETWORK

CROSS-REFERENCE TO RELATED APPLICATIONS

This application is the National Stage Entry under 35 U.S.C. § 371 of Patent Cooperation Treaty Application No. PCT/US2022/011535, filed Jan. 7, 2022, which claims the benefit of U.S. Provisional Patent Application No. 63/134,783 filed on Jan. 7, 2021; U.S. Provisional Patent Application No. 63/150,130 filed on Feb. 17, 2021; and U.S. Provisional U.S. Patent Application No. 63/185,748 filed on May 7, 2021, the disclosures of which are incorporated herein by reference in their entireties.

BACKGROUND

Mobile communications using wireless communication continue to evolve. A fifth generation may be referred to as 5G. A previous (legacy) generation of mobile communication may be, for example, fourth generation (4G) long term evolution (LTE).

SUMMARY

Systems, methods, and instrumentalities are described herein associated with link setup (e.g., link release, authorization revocation, and re-authentication) with a wireless transmit/receive unit (WTRU) to Network relay using a connectivity session subject to secondary authentication and authorization (A&A). Systems, methods, and instrumentalities are described herein associated with link setup (e.g., link release, authorization revocation, and re-authentication) with a relay using a single-network slice selection assistance (S-NSSAI) that may be subject to network slice-specific authentication and authorization (NSSAA).

A link setup with a relay using a connectivity session subject to secondary A&A may be performed. A relay WTRU may receive a direct communication request (DCR) from a remote WTRU requesting connectivity service (e.g., connectivity session parameters such as S-NSSAI, data network name (DNN), and the like). The relay may determine that a connectivity session for the service may be subject to a secondary A&A, for example, based on an indication associated with the connectivity session if already established and/or an indication associated DN from a relay proximity service (ProSe) configuration. Based on the determination, the relay may trigger a network-controlled authorization for the remote WTRU. The relay WTRU may send a direct communication accept (DCA) message including a pending secondary A&A indication, and may configure a traffic filter associated with the connection (e.g., a PC5 link), for example, to discard data traffic from the remote WTRU until a completion (e.g., a successful completion) of the secondary A&A. The relay WTRU may send a request message (e.g., an access stratum (NAS) request message) to a session management function (SMF) (e.g., including a remote WTRU ID) to initiate the connectivity session secondary A&A for the remote WTRU. The relay may forward extensible authentication protocol (EAP) authentication message(s) between the WTRU and an access and mobility management function (AMF)/SMF transparently (e.g., NAS message(s) may include the remote WTRU ID to indicate that the EAP messages may be used to authenticate the remote WTRU). The relay WTRU may receive a NAS response message from the SMF including a successful A&A indication, an EAP success message, and remote WTRU authorization information (e.g., DN-allocated IP address, DN-assigned session aggregate maximum bit rate (AMBR)). Upon success, the relay WTRU may configure the link traffic filter to authorize data traffic between the remote WTRU and the network/DN and may inform the remote WTRU including an EAP success message in a link modification procedure. The relay WTRU may relay data traffic between the remote WTRU and the network/DN.

A link setup with a relay using S-NSSAI subject to NSSAA may be performed. A relay WTRU may receive a DCR from a remote WTRU. The DCR may include a remote WTRU's identity (e.g., SUCI), S-NSSAI, the remote WTRU's NSSAA capabilities, and the like. The relay WTRU may determine the S-NSSAI requested by the remote WTRU for the ProSe (e.g., PC5) connection is subject to NSSAA, based on a local ProSe configuration and/or a prior NSSAA performed by the relay for that S-NSSAI. The relay WTRU may send a NAS request message to an AMF, for example, including the remote WTRU identity, requested S-NSSAI, and the remote WTRU's NSSAA capabilities to initiate the network-controlled authorization of the remote WTRU. The relay WTRU may transmit primary authentication message(s) between the AMF and the remote WTRU. The relay WTRU may receive a response message (e.g., a NAS response message) that may include Key material bound to the one or more of a S-NSSAI, a remote WTRU ID, an NSSAA status indication (e.g., one of success, pending, required), and the S-NSSAI. The relay WTRU may send a direct security mode command (DSMC) message to the remote WTRU that may include the NSSAA status indication and the S-NSSAI. The relay WTRU may transmit NSSAA authentication message(s) between the AMF and the remote WTRU. A NSSAA procedure may be triggered by the relay WTRU (e.g., via a NAS request) or the AMF. The relay WTRU may receive a NAS message from the AMF that may include a remote WTRU ID, a NSSAA result, and the S-NSSAI. The relay may store the S-NSSAI as allowed for the remote WTRU. The relay WTRU may send a ProSe (e.g., PC5) message (e.g., link modification request) that may include a successful NSSAA indication, and the S-NSSAI. The relay WTRU may allow the remote WTRU to use the S-NSSAI (e.g., with the connectivity session using the S-NSSAI).

During a link establishment procedure, such as a PC5 link establishment procedure, a relay WTRU may enable a remote WTRU to perform a PDU session establishment with secondary A&A following a network-controlled authorization of a remote WTRU, where the PDU session may be shared among multiple remote WTRUs. Upon successful completion of the PDU session with secondary A&A for the remote WTRU, the relay may provide the remote WTRU access to the shared PDU session.

In a PDU session secondary A&A via relay, the relay WTRU may perform an IP allocation procedure for the remote WTRU for example, an IP prefix advertisement may be performed based on one or more IP addresses by the DN-AAA received from the SMF.

In a PDU session secondary A&A via relay, the relay WTRU may derive a session AMBR for a (e.g., each) remote WTRU sharing the PDU session according to the DN-Authorized session AMBR received from the SMF.

During a link establishment procedure, such as a PC5 link establishment procedure, a relay WTRU may enable a remote WTRU to perform a NSSAA procedure using an enhanced network-controlled authorization of the remote WTRU. Upon completion (e.g., successful completion) of NSSAA procedure by the remote WTRU, the relay may provide the remote WTRU access to the S-NSSAI that was subject of NSSAA.

During a link establishment procedure, such as a PC5 link establishment procedure, a relay may enable a remote WTRU to get access to the network via the relay using the remote WTRU's security context, such as a 5G native security context, in an enhanced network-controlled authorization of the remote WTRU.

During a link establishment procedure, such as a PC5 link establishment procedure, a relay provisioned with a relay service code (RSC) that may request non-3GPP interworking function (N3IWF) access to provide a remote WTRU requesting the RSC with a connectivity to restrict the remote WTRU to establish an IPSec connection with a N3IWF located in the visited public land mobile network (VPLMN) or home PLMN (HPLMN). A relay WTRU may receive an RSC and an indication to connect with a tunnel terminating network function (e.g., a secure tunnel terminating network function). As an example, the tunnel terminating network function may be an N3IWF. The relay WTRU may identify the tunnel terminating network function, assign IPv6 prefix or IPv4 address for a remote WTRU, and configure a traffic filter to authorize traffic between the remote WTRU and the tunnel terminating network function.

BRIEF DESCRIPTION OF THE DRAWINGS

FIG. 15 illustrates an example of a link setup with a relay using a connectivity session subject to secondary A&A.

FIG. 16 illustrates an example of a link setup with a relay using S-NSSAI subject to NSSAA FIG. 17 illustrates an example where a remote WTRU may determine whether to use the remote WTRU's globally unique temporary identifier (GUTI) based on public land mobile network (PLMN) information received during a discovery procedure with a relay WTRU.

FIG. 18 illustrates an example where a relay WTRU may determine whether to use a remote WTRU's identifier (e.g., GUTI) received during a link establishment procedure (e.g., a DCR).

FIG. 19 illustrates an example where a relay WTRU may determine whether to use a remote WTRU's identifier (e.g., GUTI) received during a link establishment procedure (e.g., an identity request).

DETAILED DESCRIPTION

Figure 1A:
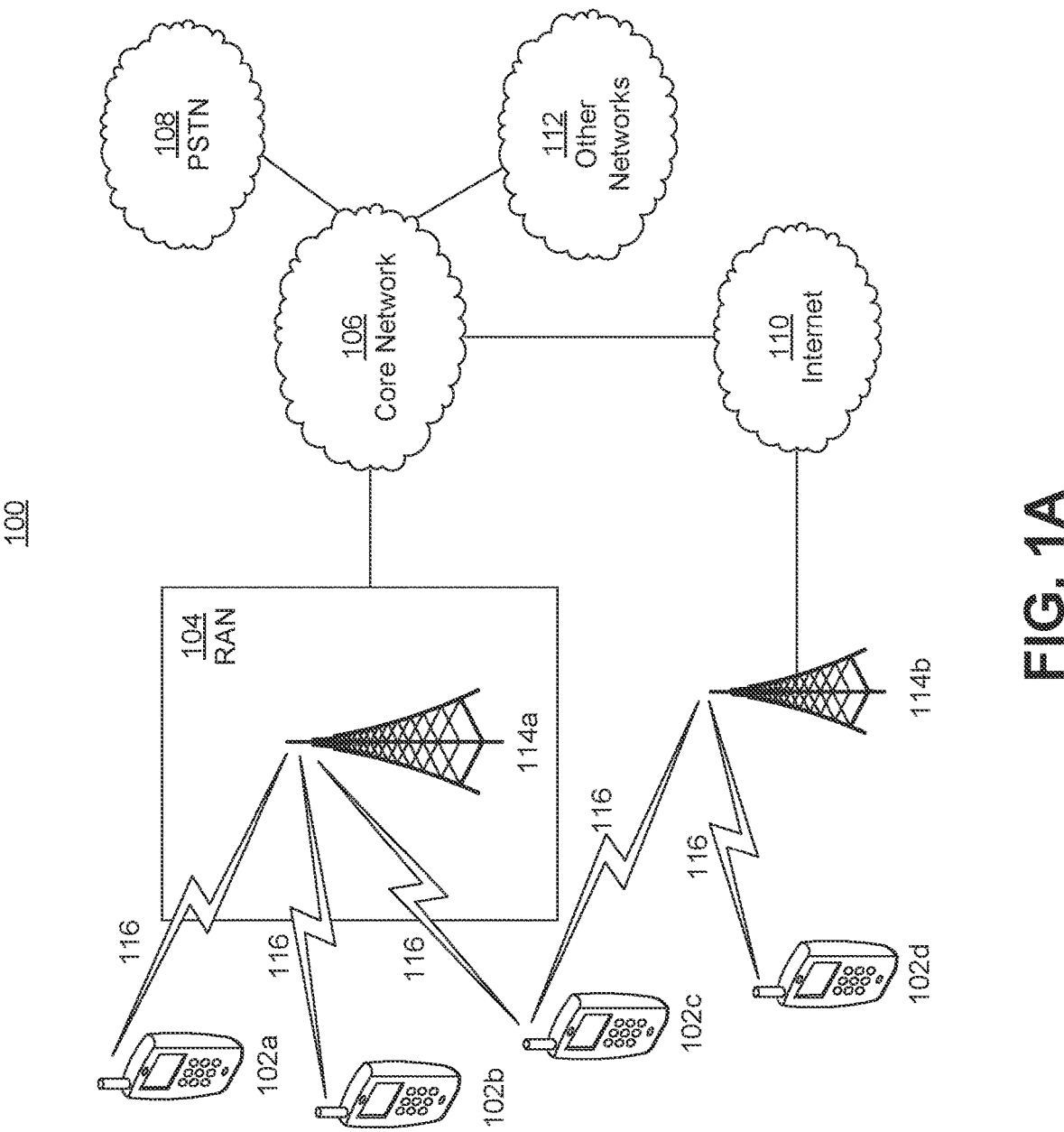
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c, and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B (eNB), a Home Node B, a Home eNode B, a gNode B (gNB), a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
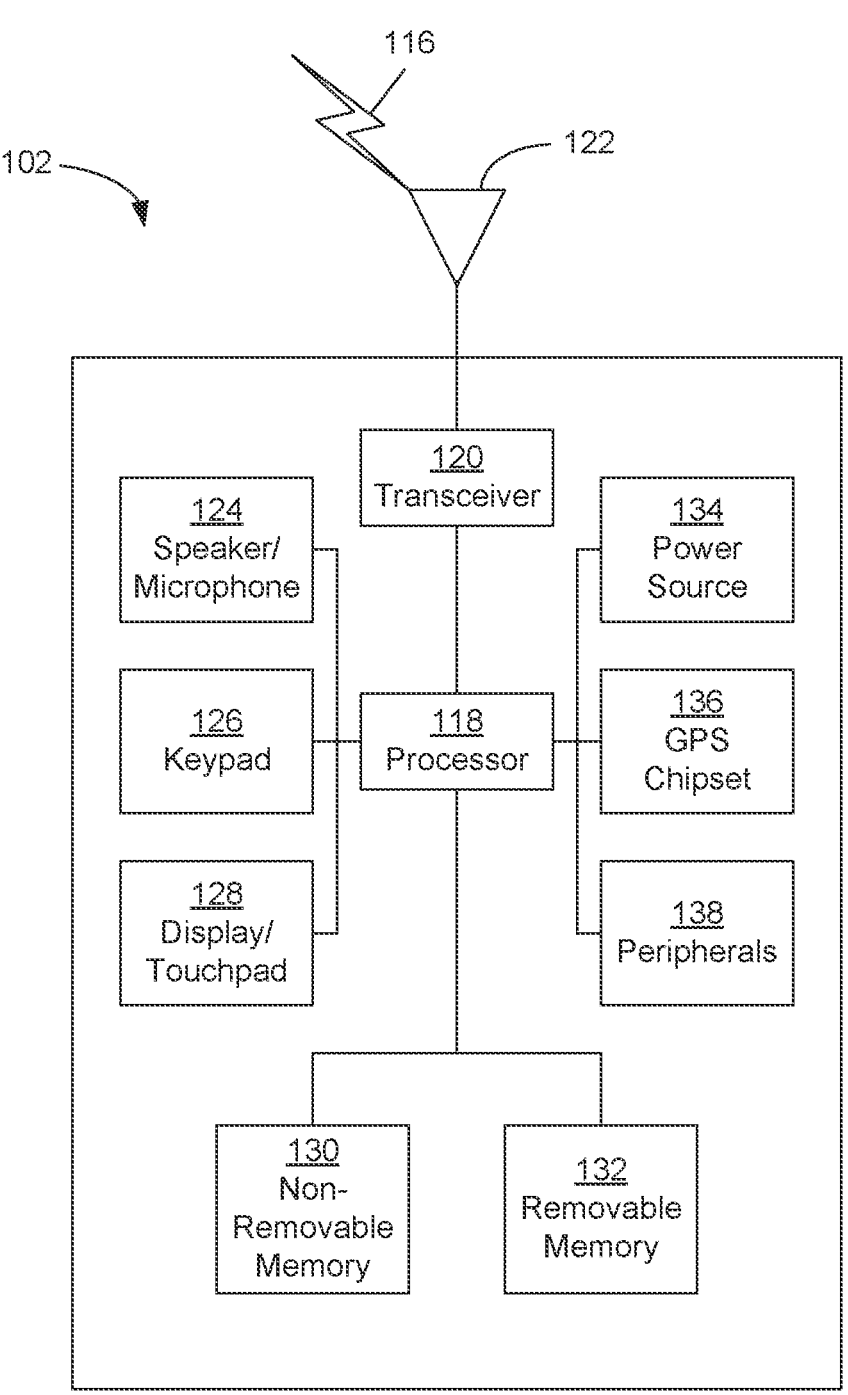
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, alight sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
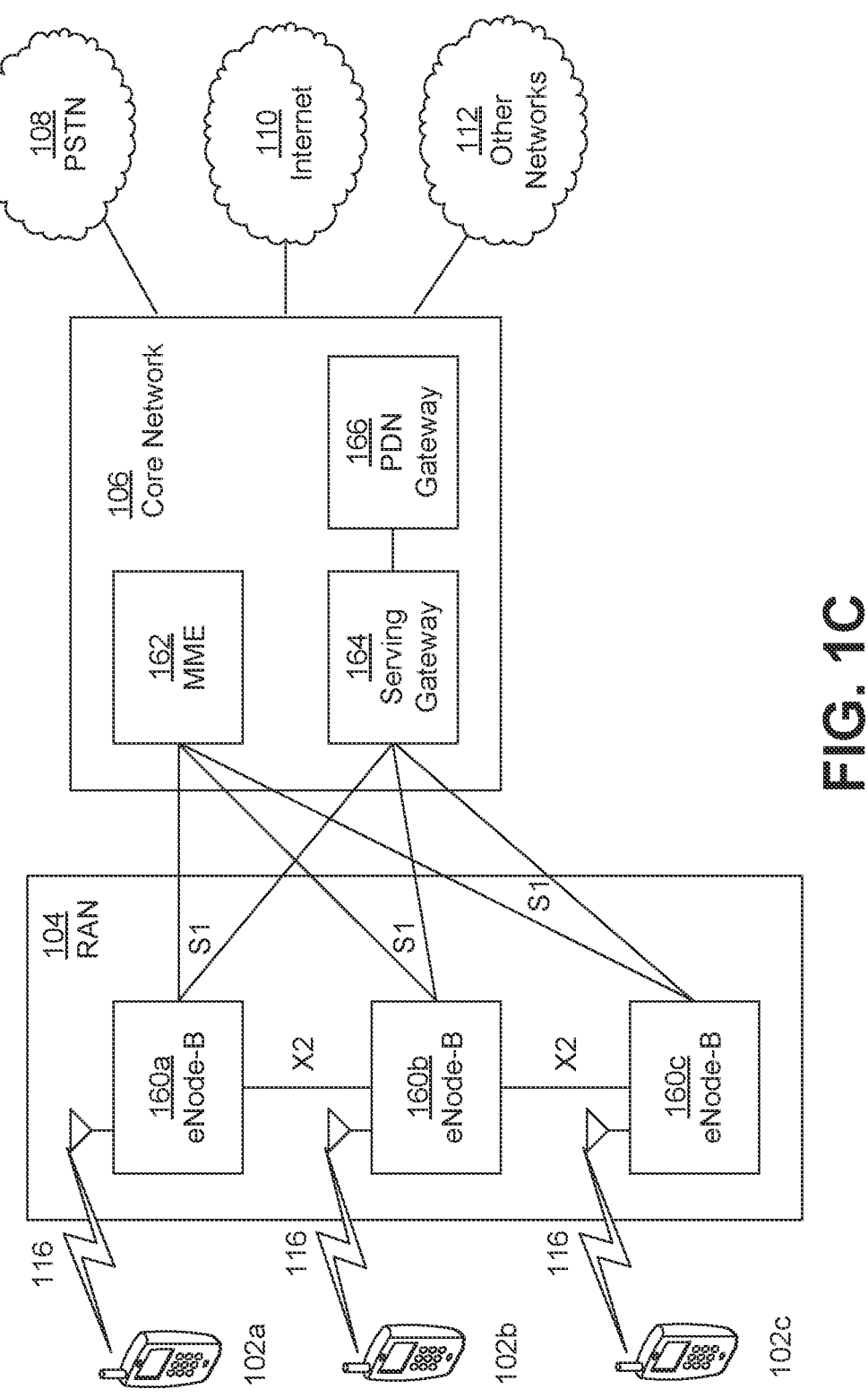
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
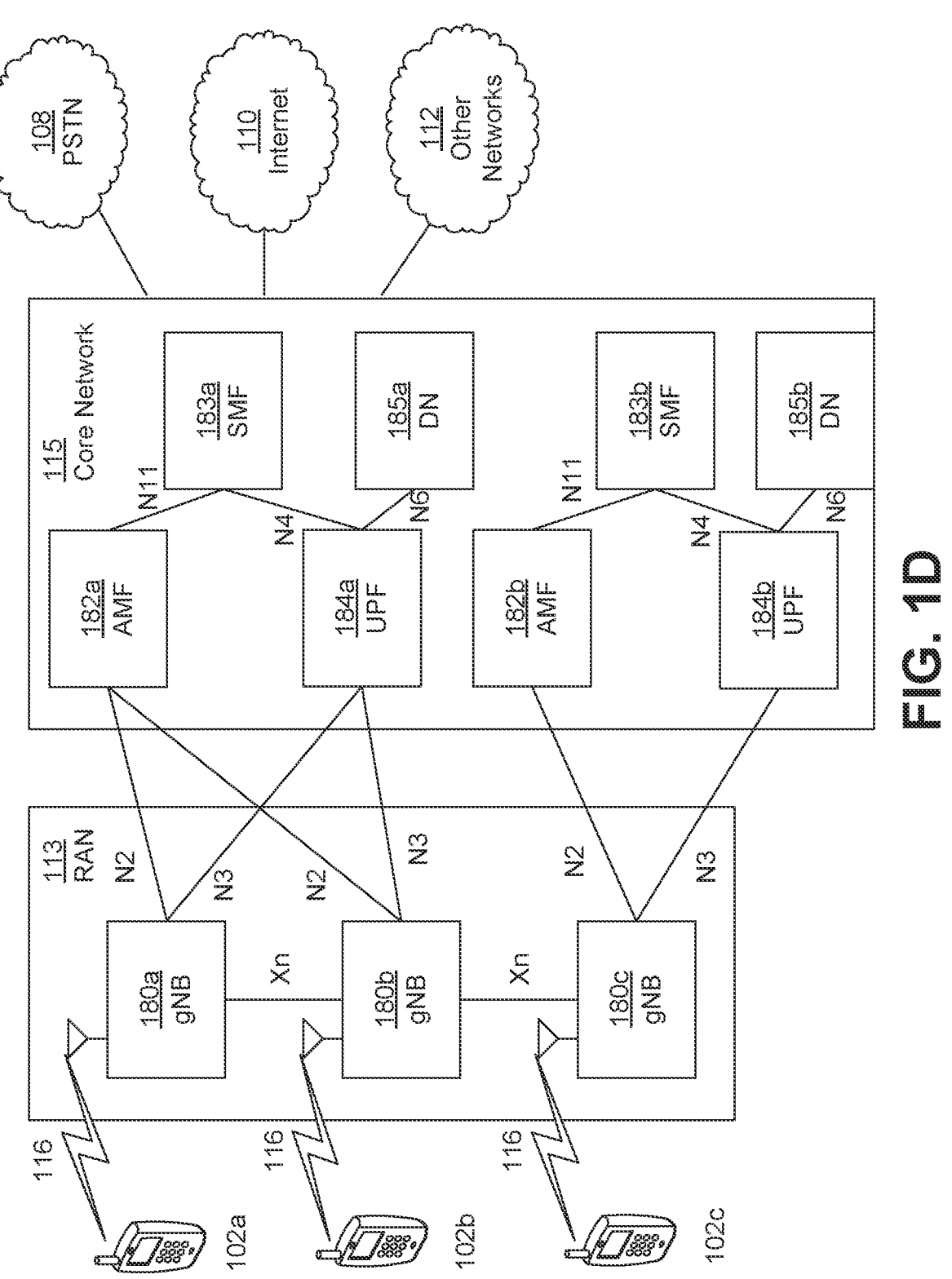
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in alab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A PDU secondary authentication and authorization (A&A) procedure may be used, for example, to authenticate and/or authorize a WTRU. A network (e.g., a session management function (SMF)), e.g., based on subscription information and/or network policy, may trigger an extensible authentication protocol (EAP)-based secondary authentication of a WTRU by a data network authentication authorization and accounting (DN-AAA) server, for example, as part of a connectivity establishment (e.g., a PDU session establishment) procedure. The DN-AAA may perform A&A of the WTRU for a connectivity session (e.g., the PDU session), for example, based on credentials (e.g., non-3GPP credentials). The DN-AAA may trigger re-authentication and/or revocation of the authorization of the WTRU to use the connectivity session, for example, at a time (e.g., any time) following a successful connectivity establishment with secondary A&A.

A&A may be network slice specific. A network slice specific secondary authentication and authorization (NS-SAA) may be performed by a WTRU. The WTRU, for example, following a mandatory primary authentication, may perform NSSAA (e.g., a NSSAA procedure) for a requested single-network slice selection assistance information (S-NSSAI) (e.g., each S-NSSAI) that may be subject to NSSAA, for example, through the AMF with a $3^{rd}$ party AAA server using credentials (e.g., non-3GPP credentials). The network (e.g., AMF) may trigger an EAP-based authentication run (e.g., based on a WTRU capability to perform NSSAA, a subscription information, an operator policy, and/or the like), for example, following the registration procedure and for the applicable S-NSSAIs. The AMF may act as the authenticator in the EAP authentication between the WTRU and the $3^{rd}$ party AAA server. In examples, if the WTRU is successfully authenticated for a given S-NSSAI, the latter may be added to the allowed NSSAI in the WTRU configuration via a WTRU configuration update (UCU) procedure. The $3^{rd}$ party AAA server may trigger re-authentication of the WTRU or revocation of the authorization to use the S-NSSAI at a time (e.g., any time) following a successful NSSAA procedure.

A ProSe Layer 3 (L3) WTRU-to-network relay (e.g., a 5G ProSe L3 WTRU-to-network relay) may be provided and/or supported. L2 and L3 WTRU-to-Network (U2NW) relay(s) may be provided and/or supported. A remote WTRU may connect to a L3 U2NW relay (e.g., using PC5 link) which may establish a PDU session or reuse/modify a PDU session (e.g., an existing PDU session), for example, over the Uu link to provide network connectivity to the remote WTRU.

ProSe security may include U2NW relay communication security. The 5GS may support authorization of a WTRU as a remote WTRU in the WTRU-to-Network relay scenario.

A PDU session secondary authentication for a remote WTRU via a Layer 3 relay may be provided and/or supported. Network-controlled authorization of a remote WTRU to access via Layer 3 WTRU-to-Network relay may be provided and/or supported.

A remote WTRU may be authorized to access, for example, via an IPSec connection, session, and/or tunnel to an N3IWF specific network slice(s) that may be subject to NSSAA or a DN that may request secondary A&A. NAS procedures (e.g., registration and/or NSSAA) may be performed using the IPSec connection, session, and/or tunnel.

Network-controlled authorization of a remote WTRU to access a network via a L3 WTRU-to-Network relay may be provided and/or enabled. The procedures may use a modified primary authentication performed via the relay (e.g., using the relay's AMF and the remote WTRU's authentication function (AUSF)). Following an authorization (e.g., a successful authorization), the remote WTRU may complete the PC5 link establishment with the WTRU-to-Network relay to be able to perform communications via the relay.

Shared PDU session(s) with secondary A&A via L3 U2NW relay may be provided and/or supported. In examples, PDU secondary A&A procedure(s) may support A&A for a WTRU (e.g., only one WTRU) to use one PDU session (e.g., exclusively). In such a case, performing a PDU session secondary A&A for multiple WTRUs (e.g., remote WTRUs) to share a PDU session (e.g., provided via a relay) may not be supported.

In examples, for an L3 U2NW relay scenario, if a PDU session (e.g., an existing PDU session) satisfies the remote WTRU PC5 connectivity requests, the relay WTRU may select it (e.g., select it automatically) to be used by remote WTRU(s) (e.g., shared with another WTRU), for example, without considering if a secondary A&A may be requested for the PDU session.

In examples, a PDU session secondary A&A via L3 relay scenario may not provide support for multiple remote WTRUs sharing the PDU session subject to the secondary A&A The scenario may not provide means (e.g., explicit means) for the remote WTRU(s) to verify whether the relay may be authorized to use the PDU session subject to the secondary A&A.

PDU secondary A&A(s) (e.g., PDU secondary A&A procedure(s)) may request a prior primary authentication of the WTRU, for example, to enable the SMF to retrieve the WTRU's subscription information. The WTRU's subscription information may be requested by an SMF during a PDU session secondary A&A procedure to enforce PDU session authorization based on subscription data, to retrieve WTRU's generic public subscription identifier (GPSI) to be provided to DN-AAA or to enable a PCF to make QoS decision(s) for the WTRU (e.g., using WTRU's subscribed aggregate maximum bit rate (AMBR)). In examples, it may not be specified how to perform a primary authentication of the remote WTRU via the relay (e.g., using procedure(s) as described herein) in relation to the PDU session secondary A&A procedure. A serving AMF may need to select an SMF in the remote WTRU's HPLMN (H-SMF) during the PDU session establishment procedure, for example, to support home routed roaming. The selection of H-SMF by AMF may request the AMF to have knowledge of the remote WTRU's subscription identity (e.g., subscription permanent identifier (SUPI)).

One or more examples described herein may provide ways in which a remote WTRU may be enabled to use a PDU session with secondary A&A via an L3 U2NW relay. One or more examples described herein may provide ways in which a PDU session secondary A&A may be performed by a DN-AAA for a remote WTRU connecting via an L3 U2NW relay (e.g., including providing SMF access to remote WTRU subscription data).

One or more examples described herein may provide ways in which a PDU session secondary re-authentication and/or authorization revocation may be performed by a DN-AAA for a remote WTRU connected via an L3 U2NW relay.

One or more examples described herein may provide ways in which sharing of a PDU session with secondary A&A between multiple remote WTRUs connected via L3 U2NW relay is supported.

One or more examples described herein may provide ways in which remote WTRU(s) may be enabled to verify that the relay WTRU is authorized to use and/or provide access to the PDU session subject to secondary A&A (e.g., or vice versa).

One or more examples described herein may provide ways in which IP address/IPv6 prefix allocation and/or assignment by DN-AAA to one or more remote WTRUs sharing the same PDU session may be enabled.

One or more examples described herein may provide ways in which the DN-authorized AMBR may be enforced, for example, when the PDU session is be shared among multiple remote WTRUs.

NSSAA via L3 U2NW relay may be provided and/or supported. In examples, the access to a slice may be granted to a WTRU if the WTRU completes an NSSAA procedure. In such a case, a U2NW relay providing a connectivity service using S-NSSAI subject to NSSAA may not be able to verify whether a remote WTRU may be authorized to use that S-NSSAI (e.g., or vice-versa). In such a case, a prior primary authentication of the WTRU may be performed to enable the AMF to retrieve the WTRU's subscription data and/or to enforce authorization related to slice access.

One or more examples described herein may provide ways in which a remote WTRU may be enabled to use an S-NSSAI subject to NSSAA via an L3 U2NW relay.

One or more examples described herein may provide ways in which NSSAA may be performed for a remote WTRU connecting via an L3 U2NW relay (e.g., including providing AMF access to remote WTRU subscription data).

One or more examples described herein may provide ways in which a slice-specific re-authentication and/or authorization revocation may be performed by an AAA server for a remote WTRU connected via an L3 U2NW relay.

One or more examples described herein may provide ways in which the relay may be enabled to verify that the remote WTRU is authorized to use the S-NSSAI subject to NSSAA (e.g., or vice-versa).

A remote WTRU authentication and/or authorization via an L3 U2NW relay may be supported, for example, using a security context, which may be a 5G native security context, of the remote WTRU.

Network-controlled authorization of a remote WTRU may support the remote WTRU using a security context, such as its native 5G security context. In an example, the context may be established during a prior network registration procedure. Enabling the remote WTRU to use its security context (e.g., native 5G) security context may enable a reconnection (e.g., a faster reconnection) via an L3 WTRU-to-Network (e.g., by avoiding primary authentication signaling via the relay).

One or more examples described herein may provide ways in which network-controlled authorization of remote WTRU(s) may be enabled to access via a Layer 3 WTRU-to-network relay, for example, using remote WTRU security context, which may be a 5G native security context.

Support for NSSAA and/or PDU secondary A&A via L3 U2NW and/or N3IWF may be provided.

In examples, a remote WTRU may be authorized to access using an IPSec connection, session, and/or tunnel to a N3IWF, specific network slice(s) that may request NSSAA and/or a DN that may request a secondary A&A. The remote WTRU may be able to access a connectivity session and/or slice (e.g., a PDU session) to connect with the N3IWF to perform NSSAA and/or a secondary authentication. In examples, if the connectivity service (e.g., relay service code (RSC)) provided by the relay is associated with an S-NSSAI that may request NSSAA and/or a DN that may request a secondary authentication, the relay may grant connectivity to the remote WTRU based on a successful completion of NSSAA or a secondary authentication (e.g., the relay may grant connectivity to the remote WTRU to use the S-NSSAI and/or to the DN until the successful completion of NSSAA or PDU secondary authentication, respectively). The remote WTRU may not be able to establish an IPSec connection, session and/or tunnel with the N3IWF to perform NSSAA and/or secondary authentication, for example, if the connectivity to the remote WTRU (e.g., to reach the N3IWF) is not granted. In examples, the remote WTRU may be allowed (e.g., only be allowed) to access an S-NSSAI that requests NSSAA and may not be able to access a separate PDU session using another S-NSSAI (e.g., any other S-NSSAI) for establishing an IPSec connection with the N3IWF, e.g., even if the relay provides a separate PDU session using a different S-NSSAI.

One or more examples described herein may provide ways to enable a remote WTRU to access a slice and/or DN via an L3 U2NW relay and/or to use N3IWF for a remote WTRU, for example, if the connectivity service provided by the relay is associated with an S-NSSAI that may request NSSAA and/or a DN that may request secondary authentication.

A connectivity session (e.g., a PDU session) secondary A&A may be performed via a relay (e.g., an L3 U2NW relay).

A PC5 link may be set up with a relay using a connectivity session (e.g., a PDU session) subject to a secondary A&A. The examples described herein that refer to a relay may be applicable to entities that may carry out the behaviors of the relay (e.g., WTRU-to-Network relay).

During a ProSe link establishment (e.g., PC5 link establishment), a relay may enable a WTRU (e.g., a remote WTRU) to perform a connectivity establishment (e.g., a PDU session establishment) with a secondary A&A, for example, following a network-controlled authorization of the remote WTRU, where a connectivity session may be shared among multiple remote WTRUs. The relay may provide remote WTRU(s) access to the shared connectivity session, for example, based on a successful completion of the connectivity establishment with a secondary A&A for remote WTRU(s). In examples, the terms "relay" and "relay WTRU" may be used interchangeably.

The relay may determine that a ProSe connection request (e.g., a PC5 connection request) from a remote WTRU is associated with a connectivity session (e.g., a PDU session) subject to secondary A&A, for example, based on an established relay WTRU PDU session establishment performed by a relay with secondary A&A and/or a ProSe configuration indicating that DN uses secondary A&A. The relay may trigger a network-controlled authorization (e.g., an authorization procedure) of a remote WTRU, for example, based on the determination that the connection request from the remote WTRU is associated with the connectivity session subject to secondary A&A and/or that the connection request is using a remote WTRU identity (e.g., subscription concealed identifier (SUCI) or globally unique temporary identifier (GUTI)) received in the connection request. For example, SUCI may be an encrypted SUPI. SUCI may be used for WTRU initial registration/authentication with the network, for example, for privacy protection reasons. The relay may establish the security of the ProSe link (e.g., PC5 link) with the remote WTRU on the condition of a successful authorization of the remote WTRU by the network. The relay may inform the remote WTRU of a pending connectivity session (e.g., a PDU session) with secondary A&A with an indication via a ProSe (e.g., PC5) message (e.g., direct communication accept (DCA)). The relay may allocate an IP address and/or an IPv6 prefix for remote WTRU (s). The relay may configure a default filter (e.g., a default IP filter) for the ProSe link (e.g., PC5 link) to discard data traffic, for example, until successful completion of a connectivity session (e.g., PDU session) secondary A&A. The indication may indicate a state. For example, the indication may be and/or may indicate a link state (e.g., extended link state or Uu link state). Ian example, the link state may be set to pending A&A. The default value of the state (e.g., link state) may be set to a ready state, e.g., if the state or a value of the state is not included in a DCA message. The relay may verify (e.g., use a filter on) the state (e.g., the link state) when receiving data traffic from the remote WTRU. The relay may drop the data traffic, for example, if the state is not set to a ready state.

The relay may trigger a connectivity session secondary A&A (e.g., the PDU session secondary AMA) for a remote WTRU within the network (e.g., an SMF) via a non-access stratum (NAS) message (e.g., an NAS message including a remote WTRU ID and/or addressing information). The relay may forward the EAP authentication message(s) between the WTRU and AMF/SMF (e.g., transparently). NAS messages exchanged between relay and the SMF may include the remote WTRU identification (ID) (e.g., to indicate that the authentication messages are for remote WTRU authentication). The relay may mark the remote WTRU as authorized by DN for the connectivity session, for example, based on receiving a NAS message from an SMF indicating a successful connectivity session secondary A&A for the remote WTRU. For example, the relay WTRU may store a list of remote WTRU(s) that have been authorized for a connectivity session (e.g., a PDU session) and/or may set the related ProSe link state (e.g., PC5 link state) to "ready". The relay WTRU may send a ProSe (e.g., PC5) message (e.g., a link modification request message) informing the remote WTRU of successful secondary A&A, for example, including the EAP success message from the SMF and/or the link state set to "ready". The relay may configure the ProSe (e.g., PC5) link traffic filtering (e.g., IP and non-IP traffic) to allow relayed data traffic between the remote WTRU and the network/DN, for example, on the condition that the connectivity session secondary A&A is successful.

Figure 2:
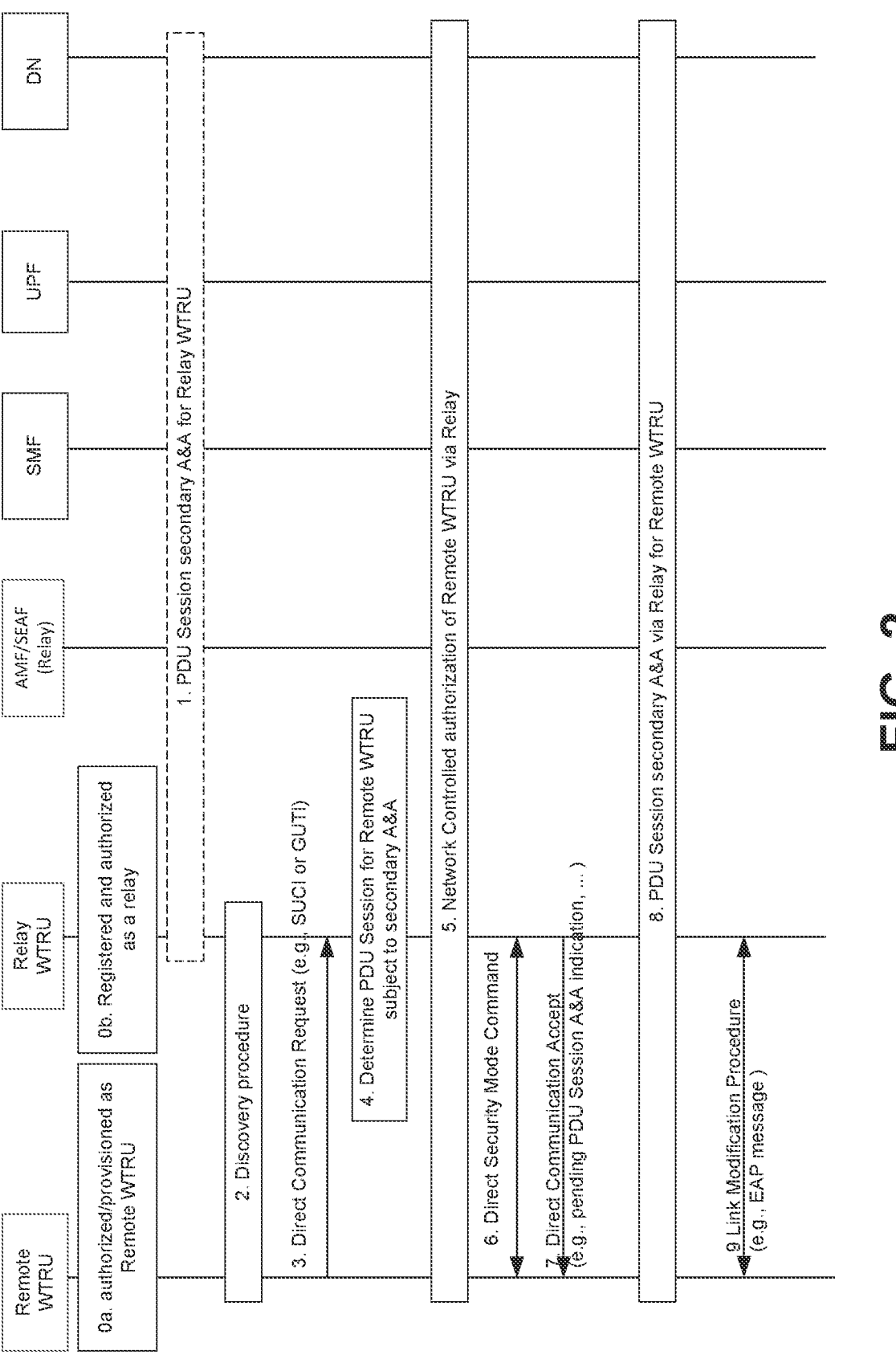
FIG. 2 is a diagram illustrating an example of ProSe (e.g., PC5) link setup with a relay using a PDU session that may be subject to secondary A&A.

FIG. 2 is a diagram illustrating an example of ProSe (e.g., PC5) link setup with a relay using PDU session subject to secondary A&A. 0a, 0b, 1-13, 2a, 2b, 3b, 4a, 4b, 4C, 5b, 7a and 7b used in one or more FIGS. 2-14 are reference numerals. At 0a, a remote WTRU may be authorized and/or provisioned (e.g., with authorization parameters) to act as a remote WTRU. At 0b, a relay WTRU may be provisioned (e.g., with authorization parameters such as registered and/or authorized) to act as a relay WTRU.

At 1, the relay may perform a connectivity session secondary A&A (e.g., PDU session secondary A&A by DN-AAA). In examples, the relay may be provisioned with credential(s) used in relation to the example call flow as described with respect to FIG. 2.

At 2, the remote WTRU and/or the relay WTRU may perform discovery (e.g., a discovery procedure). In examples, the remote WTRU and the relay WTRU may perform a discovery procedure whereby the remote WTRU may discover the connectivity service provided by the relay (e.g., based on a broadcasted service type and/or code).

At 3, the remote WTRU may determine (e.g., from the configuration at 0) that the service code is associated with a DN that uses secondary A&A. The remote WTRU may send a direct communication request (DCR) message (e.g., including a remote WTRU's subscription identity and/or network identity such as SUPI or GUTI), for example, based on the determination that the service code is associated with a DN that uses secondary A&A.

At 4, the relay may determine that a connectivity session subject to secondary A&A is to be used to meet the remote WTRU's request, for example, based on receiving the DCR message. In examples, the relay may determine that a PDU session that uses secondary A&A may be needed to fulfill the remote WTRU request. The determination that the connectivity session subject to secondary A&A is to be used to meet the remote WTRU's request may be based on one or more of the following: an established PDU session (e.g., existing PDU session) that satisfies the remote WTRU connectivity requirements (e.g., as established at 1) may be marked with an indication that secondary A&A may be requested or from the configuration at 0, the service code may be associated with a DN that may be marked with a parameter indicating that the DN requests secondary A&A.

At 5, the relay may trigger a network-controlled authorization of the remote WTRU (e.g., as described with respect to FIG. 9 or FIG. 14), for example, on the condition that the DCR message includes an SUCI or GUTI. Referring to FIG. 2, in examples, the relay may send an identity request message to the remote WTRU to obtain the remote WTRU ID to perform a network-controlled authorization (e.g., authorization procedure) of the remote WTRU. The relay may reject the remote WTRU request, for example, if the remote WTRU fails to provide a remote WTRU ID used for the network-controlled authorization. The relay may provide via the rejection message a cause indicating that an identity parameter (e.g., SUPI or GUTI) may be missing.

At 6, the relay may initiate a direct security mode command (DSMC) procedure with the remote WTRU to establish the security of the ProSe link (e.g., PC5 link), for example, based on successful network-controlled authorization (e.g., authorization procedure) of the remote WTRU.

At 7, the relay may send a DCA message, for example, successful based on security establishment. The DCA message may include an indication that a PDU session with secondary A&A may be pending. The relay may allocate an IP address and/or IPv6 prefix for the remote WTRU. The relay may configure a traffic filter (e.g., as a default filter for IP or non-IP traffic) for the ProSe link (e.g., PC5 link) to prevent data traffic (e.g., any data traffic) until successful completion of a subsequent PDU session secondary A&A (e.g., as described with respect to 8). The remote WTRU, e.g., based on the indication via the DCA message, may refrain from sending data traffic (e.g., any data traffic) over the ProSe link (e.g., PC5 link) until successful completion of a subsequent PDU session secondary A&A. In examples, the indication may be a link state set to "pending A&A." The relay may use the link state to set a filter and/or verify the link state to prevent forwarding data traffic on and/or from the ProSe link. In examples, the remote WTRU may send data over a PC5 unicast link with the relay. The PC5 unicast link may be identified by the src/dst L2 IDs. The relay may set a filter on the values of arc/dst L2 IDs identifying the PC5 link. The relay may associate an action on the PC5 link set to "check link state" (e.g., for a pending A&A state), for example, instead of "forward data" (e.g., for a ready state). The link state may be saved in the relay's PC5 link table. The remote WTRU may refrain from sending data traffic until the link state may be set to "ready."

Figure 3:
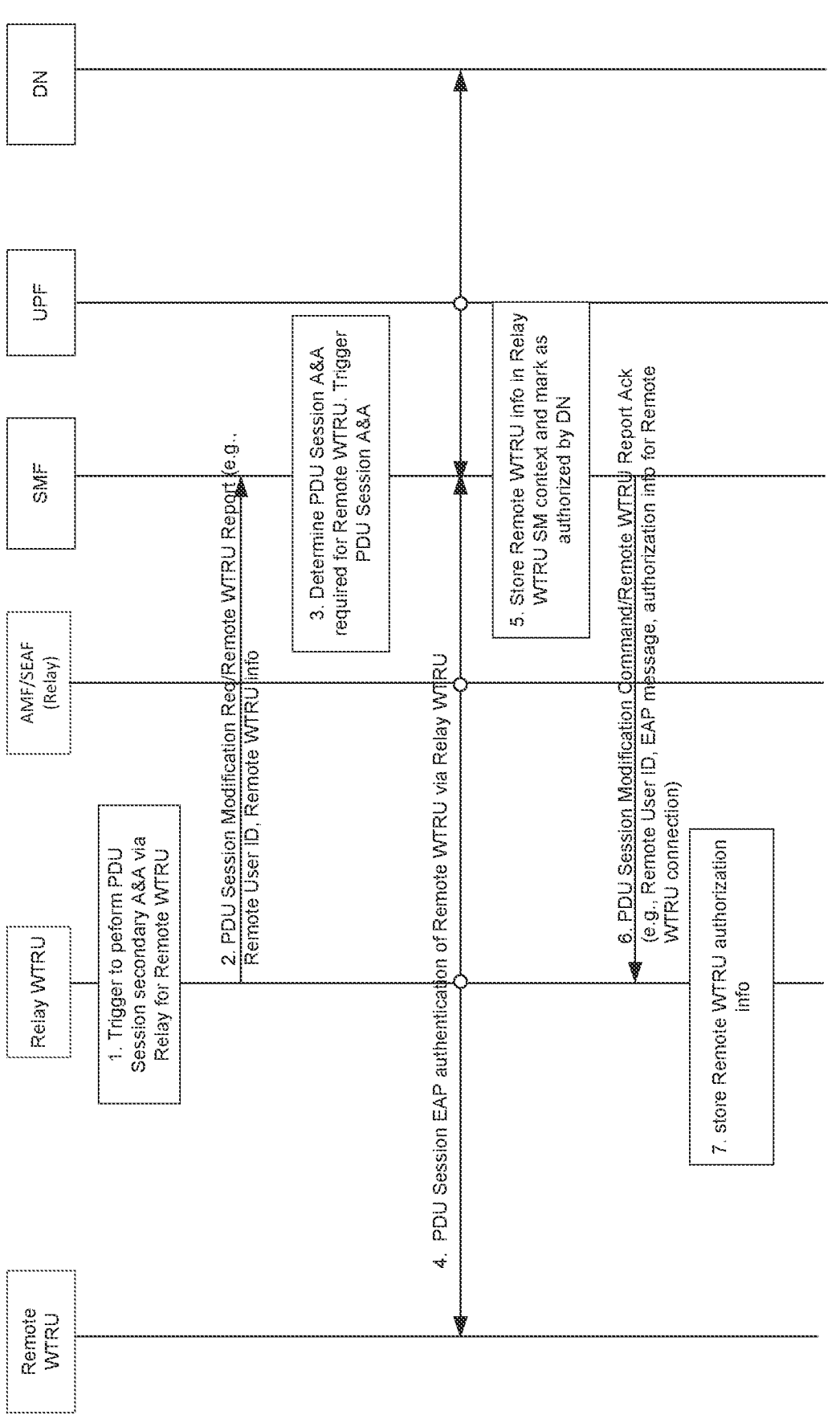
FIG. 3 is a diagram illustrating an example of a PDU session secondary A&A via relay (e.g., a PDU session secondary A&A via relay procedure).

At 8, the relay may trigger a PDU session secondary A&A via a relay procedure, for example, as described with respect to FIG. 3.

At 9, the relay may send a ProSe message (e.g., a PC5 message) based on a successful (e.g., PDU session with) secondary A&A over relay procedure. The ProSe message (e.g., a PC5 link modification request) may include a successful indication (e.g., and/or a link state set to "ready"). The ProSe message and/or the successful indication may include an EAP success message (e.g., the EAP success message may be received from the SMF at 8) and/or QoS parameter(s) (e.g., AMBR for the remote WTRU as described herein). The relay may configure the ProSe link to allow data traffic between the remote WTRU and the network/DN (e.g., remove the filter configured at 7) and may set the link state to "ready". The relay may allocate an IP address and/or IPv6 prefix for the remote WTRU (e.g., if none were allocated at 7) to be used with the established connectivity session (e.g., the established PDU session). In examples, if the PDU session with secondary A&A fails, the relay may release the ProSe link (e.g., PC5 link) indicating the failure cause. A reject message may include an EAP failure message (e.g., the EAP failure message may be received from the SMF at 8).

In examples, the relay may trigger the PDU session secondary A&A over relay procedure during the link establishment procedure (e.g., perform 8 in FIG. 2 before 7 in FIG. 2), for example, after 6 in FIG. 2. In such a case, messages (e.g., PC5-signaling(S) messages) may be used to carry authentication message(s) for the PDU session secondary A&A to and/or from the remote WTRU or the access stratum (AS) layer may be configured with ProSe (e.g., PC5) link information (e.g., L2 IDs and/or QoS parameters). The ProSe link information may be used for bearer configuration. The relay may send a DCA message that includes a successful secondary A&A indication based on a successful (e.g., PDU session with) secondary A&A over relay procedure. The DCA message may include an EAP success message (e.g., the EAP success message may have been received from the SMF). In examples, if the PDU session with secondary A&A fails, the relay may send a ProSe reject message (e.g., PC5 reject message) indicating the failure cause. The reject message may include an EAP failure message (e.g., the EAP failure message may have been received from the SMF).

FIG. 3 is a diagram illustrating an example of a PDU session secondary A&A via a relay (e.g., a PDU session secondary A&A via relay procedure).

At 1, a relay WTRU may decide to trigger a PDU session secondary A&A for the remote WTRU abased on conditions as determined in FIG. 2.

At 2, the relay may send a NAS message (e.g., a PDU session modification, establishment request, and/or a remote WTRU report), for example, to the SMF. The NAS message may include one or more of the following: remote WTRU user ID, remote WTRU addressing information, or other connectivity session (e.g., PDU session) parameters (e.g., S-NSSAI, DNN, and/or the like). The SMF may receive the NAS message which includes the remote WTRU subscription identity (e.g., SUPI) from an AMF. The remote WTRU subscription identity may be obtained by the AMF during a controlled authorization of the remote WTRU (e.g., as described with respect to FIG. 9 or FIG. 14).

At 3, the SMF may determine, e.g., based on subscription information, that the requested DN may be subject to secondary A&A and/or may trigger a PDU session secondary A&A of the remote WTRU via relay.

At 4, the remote WTRU may perform a PDU session secondary A&A via a relay. Authentication message(s) may be transported using one or more NAS messages between the SMF and the relay. The one or more NAS messages may include an identity of the remote WTRU (e.g., GPSI, remote user ID, and/or the like) to indicate to the relay that authentication message(s) are for the remote WTRU. The relay may forward the message(s) (e.g., transparently) between the remote WTRU and the SMF. A DN-AAA may allocate and/or assign an IP address and/or IPv6 prefix for the remote WTRU during the procedure as described herein (e.g., as described with respect to FIG. 8). The DN-AAA may authorize QoS parameter(s) (e.g., session AMBR) for the remote WTRU using the shared PDU session as described herein. The SMF may maintain an N4 session with the DN-AAA for the WTRUs (e.g., all WTRUs) sharing the PDU session, e.g., as long as the PDU session is not released.

At 5, the SMF may store the remote WTRU information in a relay session management (SM) context, for example, based on successful PDU session secondary A&A via the relay procedure. The remote WTRU information and/or the relay session management context may include one or more of a remote WTRU identity (e.g., SUPI and/or GPSI), individual authorization status, and/or information (e.g., assigned IP, QoS parameters, and/or the like) received from the DN-AAA.

At 6, the SMF may send a NAS message (e.g., PDU session modification, establishment response, and/or remote WTRU report acknowledgment) to the relay indicating the result of the PDU session secondary A&A. The NAS message may include an identity of the remote WTRU (e.g., GPSI and/or remote user ID) and/or an EAP success or failure message. The NAS message may include addressing and/or QoS information associated with the remote WTRU, for example, in the case of successful secondary A&A. The relay may use (e.g., enforce) the addressing and/or QoS information associated with the remote WTRU based on one or more examples described herein such as the example as descried with respect to FIG. 8.

At 7, the relay may mark the remote WTRU as authorized by the DN and/or may store received authorization information associated with the remote WTRU on the condition of a successful PDU session secondary A&A. The relay WTRU may proceed with the rest of ProSe link setup (e.g., the PC5 link setup with relay), for example, using PDU session subject to secondary A&A as described with respect to FIG. 2.

A connectivity session (e.g., a PDU session) with secondary A&A may be released. During a connectivity session (e.g., a PDU session) release, an SMF may enable the removal of a remote WTRU from the WTRUs authorized to use a shared connectivity session (e.g., a PDU session subject to secondary A&A and provided via a relay).

Figure 4:
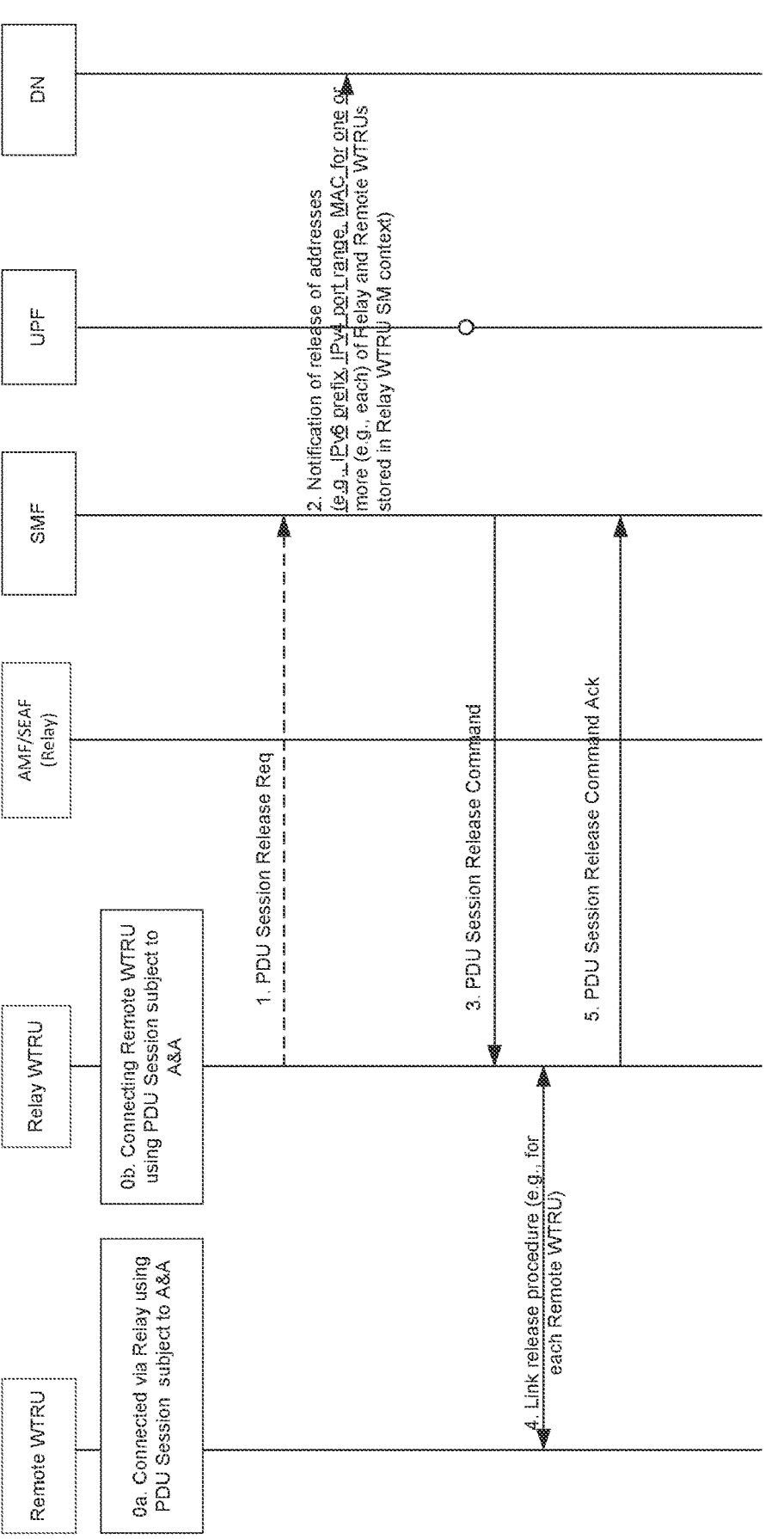
FIG. 4 is a diagram illustrating an example of a PDU session release that may be triggered by a relay WTRU or the Network.

During a connectivity session release (e.g., a PDU session release procedure), an SMF may determine that a connectivity session (e.g., a PDU session) may be subject to secondary A&A and/or may be used for relayed communication(s) by multiple remote WTRUs, for example, based on a relay WTRU SM context information. The SMF may send a notification of release of address to a DN-AAA for one or more of the remote WTRUs (e.g., each of the one or more remote WTRUs) sharing the connectivity session based on the relay WTRU SM context. An example procedure may be described with respect to FIG. 4. FIG. 4 is a diagram illustrating an example of a PDU session release triggered by a relay WTRU or the Network.

At 0a and 0b, a remote WTRU may be connected to the relay WTRU, for example, using a shared PDU session subject to secondary A&A.

At 1, the relay may trigger the PDU session release procedure with an SMF by sending to the SMF a PDU session release request. In examples, the SMF may trigger the PDU session release procedure in which case this may not be performed.

At 2, the SMF may notify a DN of the release of the IP address and/or IPv6 prefix for one or more of the WTRUs (e.g., each of the one or more WTRUs) sharing the PDU session that are stored in the relay SM context (e.g., as described with respect to FIG. 3). The SMF may release the user plane (UP) resource(s) used by the PDU session including the PDU session context.

At 3, the SMF may send a PDU session release indication (e.g., command) to the relay.

At 4, the relay may release the ProSe link (e.g., PC5 link) with one or more remote WTRU(s) (e.g., each of the one or more remote WTRUs) sharing the PDU session.

At 5, the relay may acknowledge the release command message by sending an acknowledgment to the SMF.

Figure 5:
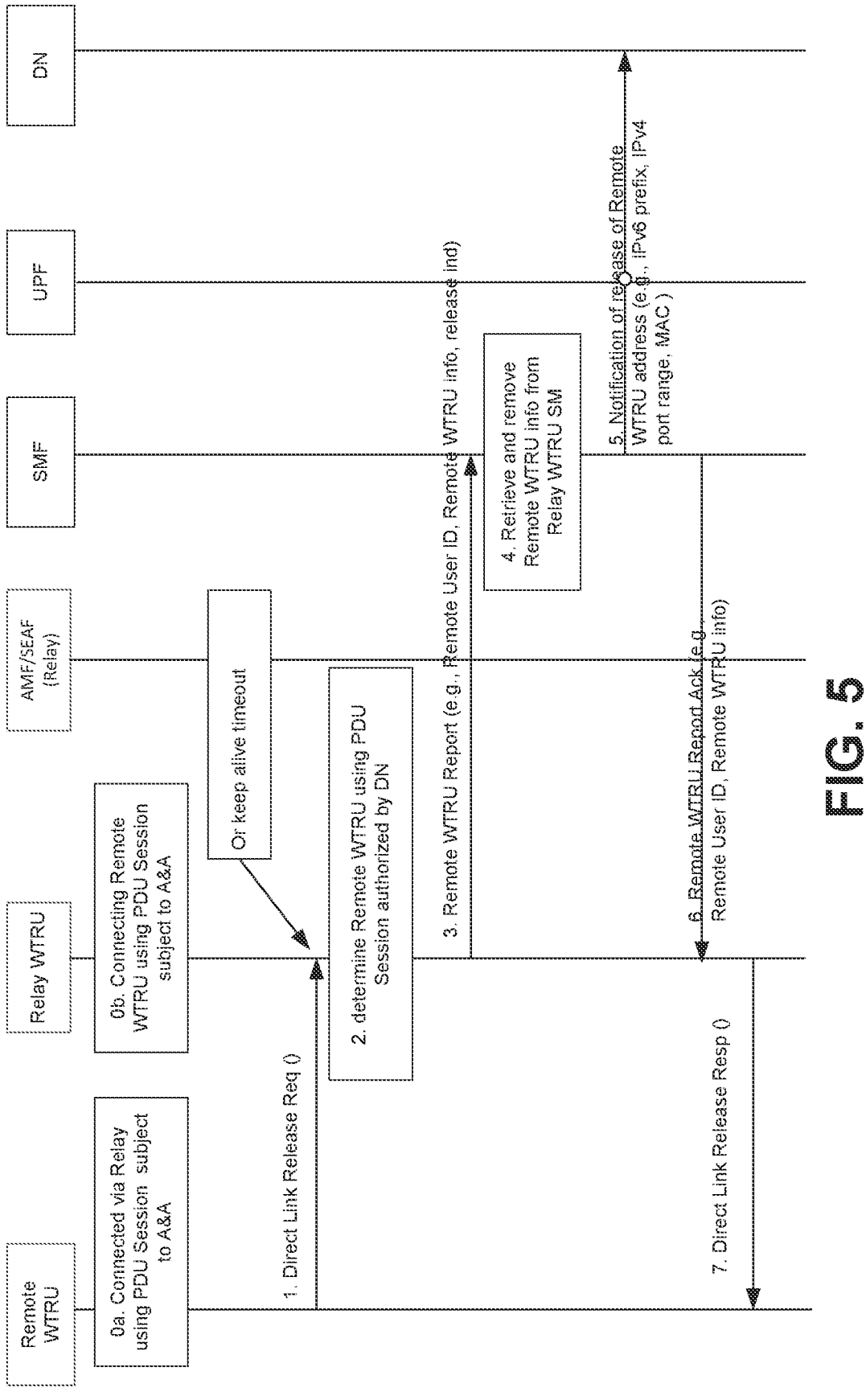
FIG. 5 is a diagram illustrating an example of a ProSe link (e.g., PC5 link) release associated with a shared PDU session subject to secondary A&A.

FIG. 5 is a diagram illustrating an example of a ProSe link (e.g., PC5 link) release associated with a shared PDU session subject to secondary A&A.

During a ProSe link (e.g., PC5 link) release procedure, a relay may enable the removal of a remote WTRU from the WTRUs authorized to use a shared connectivity session (e.g., a PDU session subject to secondary A&A and provided via the relay).

During a ProSe release (e.g., PC5 release) procedure, a relay may determine that a connectivity session (e.g., a PDU session) used by a remote WTRU is subject to secondary A&A. The relay may send to the serving SMF a message (e.g., a NAS message), for example, including the remote WTRU ID, addressing information, and/or a release indication for the remote WTRU. The relay may complete a ProSe link (e.g., PC5 link) release procedure based on receiving the NAS message from the SMF confirming the removal of the remote WTRU from the connectivity session. In examples, the relay may complete the ProSe (e.g., PC5) release procedure prior to initiating or completing the removal of a remote WTRU from the WTRUs sharing the PDU session. FIG. 5 is a diagram illustrating an example of a ProSe link (e.g., PC5 link) release associated with a shared PDU session subject to secondary A&A.

At 0a and 0b, a remote WTRU may be connected to a relay WTRU using a shared PDU session subject to secondary A&A At 1, the remote WTRU and/or the relay WTRU may initiate a direct link release procedure, for example, by sending a release request. A release may be triggered if a time (e.g., (e.g., a keep alive timer) expires. For example, a release may be triggered by an expiration of time, may be triggered after a duration of time, and/or the like.

At 2, the relay WTRU may determine that the ProSe link (e.g., PC5 link) with the remote WTRU may be associated with a shared PDU session.

At 3, the relay may initiate the removal of the remote WTRU from the WTRUs sharing the PDU session, for example, based on the determination at 2. The relay may send a NAS request message to a SMF indicating the release of resources associated with remote WTRU including a remote WTRU identity (e.g., a remote user ID, GPSI, and/or the like), remote WTRU addressing information, and/or a release indication.

At 4, the SMF may retrieve and/or remove remote WTRU information from a relay WTRU SM context and/or may release address(es) (e.g., any address) allocated for the remote WTRU. The SMF may configure a user plane function (UPF) to drop remaining (e.g., any remaining) packets associated with the remote WTRU, e.g., while retaining the N4 session with a DN-AAA to continue serving the other WTRUs that share the PDU session.

At 5, the SMF may notify the DN-AAA of the release of information associated with the remote WTRU (e.g., IP address and/or IPv6 prefix assigned and/or used by the remote WTRU and/or a MAC).

At 6, the SMF may send a response message (e.g., a NAS response message) to the relay indicating the remote WTRU identity and/or the remote WTRU information. The NAS response message may include a remote WTRU report acknowledgment.

At 7, the relay may complete the ProSe link release procedure, for example, by sending a release response to the remote WTRU.

Authorization, re-authentication, and/or revocation by DN-AAA of a remote WTRU using a PDU session (e.g., shared PDU session) with secondary A&A may be performed.

During an authorization revocation by DN-AAA, an SMF may enable the removal of a remote WTRU from the WTRUs authorized to use a shared connectivity session (e.g., a PDU session subject to secondary A&A and provided via a relay).

Figure 6:
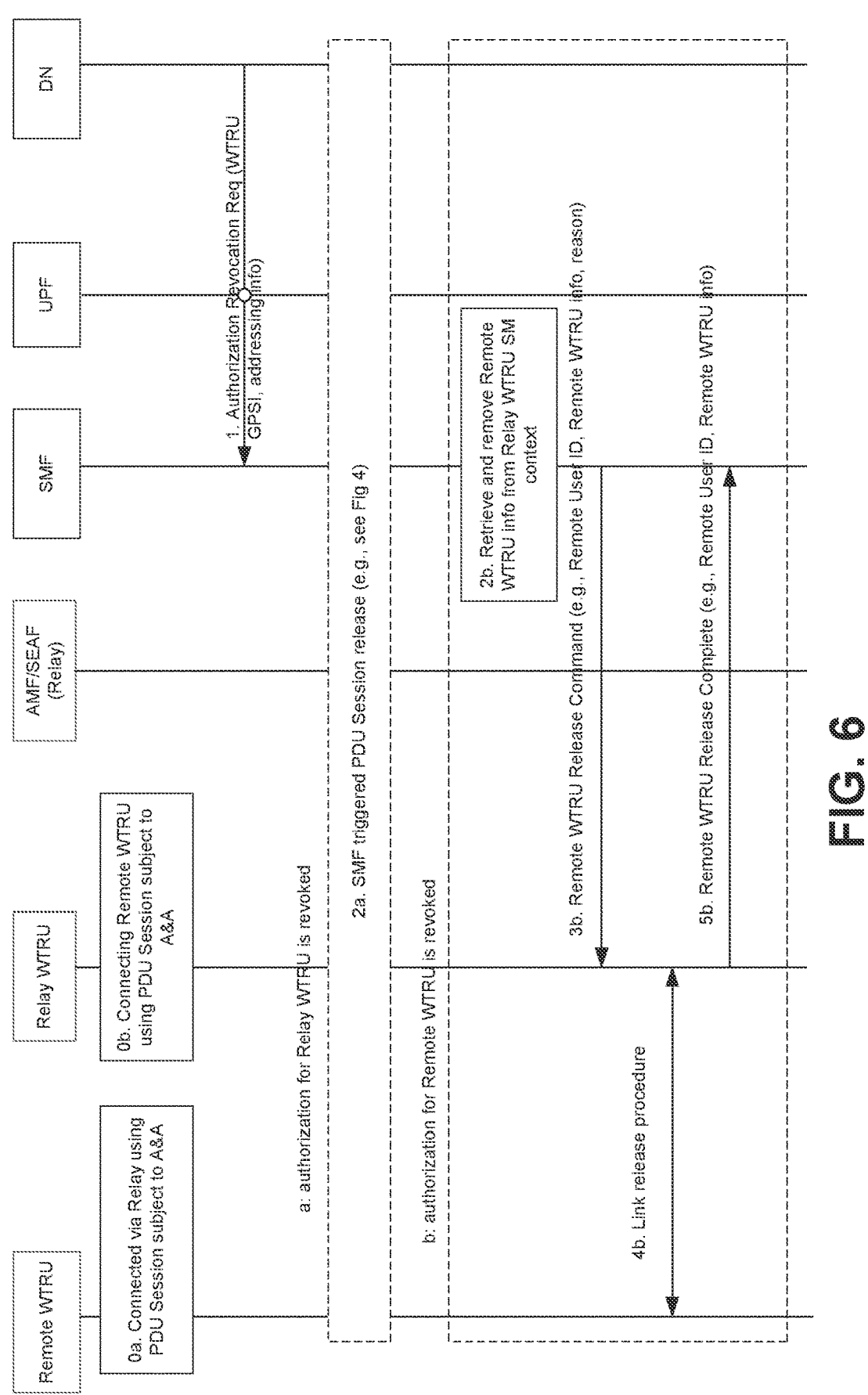
FIG. 6 is a diagram illustrating an example of an authorization revocation by DN-AAA for a remote WTRU using a shared PDU session.

Based on receiving a revocation request message from a DN (e.g., including relay and/or remote WTRU GPSI and/or addressing information), the SMF may locate a relay WTRU SM context based on the information provided and remove the remote WTRU ID and information from the relay SM context (e.g., as one of the WTRUs authorized for the connectivity session). The SMF may send a message (e.g., an NAS command message) that may include the remote WTRU ID and/or information to revoke the remote WTRU's authorization for using relaying with the PDU session subject to secondary A&A. FIG. 6 is a diagram illustrating an example of authorization revocation by DN-AAA for a remote WTRU using shared PDU session.

At 0a and 0b, a remote WTRU may be connected to a relay WTRU using a shared PDU session subject to secondary A&A.

At 1, a DN may initiate an authorization revocation for a WTRU using the shared PDU session, for example, by sending to an SMF a message (e.g., an authorization revocation request). The message may include an identity of a WTRU (e.g., GPSI) and/or addressing information (e.g., IP and/or Mac address). The SMF may identify the shared PDU session and the WTRU based on the provided information.

At 2, depending on whether the message (e.g., the request) is for the relay or a remote WTRU, one of the following may be performed. If the WTRU identified for revocation is the relay WTRU, the SMF (e.g., shown in 2a) may initiate a network-triggered PDU session release (e.g., as described in one or more examples herein such as the example shown in FIG. 4) which may complete an authorization revocation (e.g., procedure). If the WTRU identified for revocation is a remote WTRU, the SMF (e.g., shown in 2b) may retrieve and/or remove remote WTRU information from a relay WTRU SM context and/or may release address(es) (e.g., any address) allocated for the remote WTRU. The SMF may configure the UPF to drop remaining (e.g., any remaining) packets associated with the remote WTRU, e.g., while retaining the N4 session with a DN-AAA to continue serving the other WTRUs that share the PDU session.

At 3b, the SMF may send a message (e.g., an NAS command message) to release the connection with the remote WTRU whose authorization is being revoked. The message may include one or more of a remote WTRU identity (e.g., remote user Id, GPSI, and/or the like), remote WTRU addressing information, and/or an indication of the reason for the release.

At 4b, the relay WTRU may initiate a ProSe link (e.g., PC5 link) release procedure with the remote WTRU.

At 5b, the relay may acknowledge the message to release the connection (e.g., the NAS command message), for example, by sending a message indicating release complete to the SMF. The message may include the remote WTRU identity (e.g., remote user ID, GPSI, and/or the like) and/or the remote WTRU information.

Figure 7:
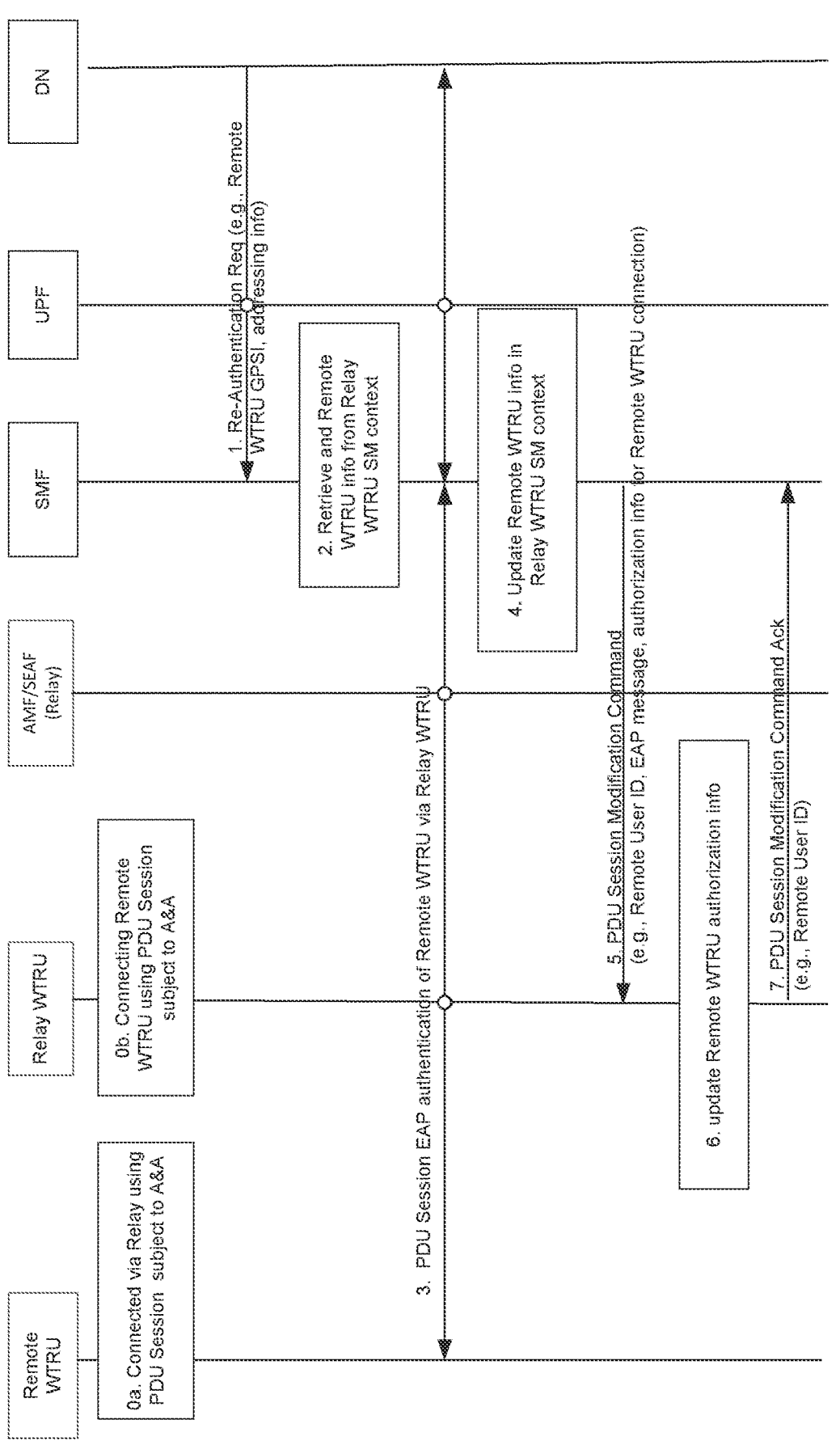
FIG. 7 is a diagram illustrating an example of re-A&A by DN-AAA of a remote WTRU using a shared PDU session.

A procedure for re-authentication and/or re-authorization by DN-AAA of a remote WTRU using shared PDU session may be described with respect to FIG. 7. FIG. 7 is a diagram illustrating an example of re-A&A by DN-AAA of a remote WTRU using a shared PDU session.

At 0a and 0b, a remote WTRU may be connected to a relay WTRU using a shared PDU session subject to secondary A&A.

At 1, a DN may initiate a re-authentication procedure for a remote WTRU using the shared PDU session, for example, by sending an SMF a message (e.g., a re-authorization request). The message may include an identity of the remote WTRU (e.g., GPSI) and/or addressing information (e.g., IP and/or Mac address).

At 2, the SMF may identify the shared PDU session and/or the remote WTRU based on the provided information (e.g., from 1).

At 3, the SMF may initiate a PDU session secondary A&A (e.g., EAP authentication) of the remote WTRU via a relay (e.g., procedure), for example, as described with respect to FIG. 3.

At 4, the SMF may update the remote WTRU information in a relay WTRU SM context, for example, if during the procedure, different authorization information (e.g., new authorization information) may be provided by a DN-AAA.

At 5, the SMF may send an NAS command message (e.g., PDU session modification command) to the relay indicating the result of the PDU session secondary re-authentication and/or re-authorization. The message may include one or more of an identity of the remote WTRU (e.g., a GPSI, a remote user ID, and/or the like) and/or an EAP success or failure message. The message may include different authorization information (e.g., new authorization information) associated with the remote WTRU connection in the case of successful secondary re-A&A.

At 6, the relay WTRU may update authorization information (e.g., any authorization information) associated with the remote WTRU with different information (e.g., new information) received from the SMF in case of successful secondary re-A&A of the remote WTRU. In case of failed re-A&A procedure, the relay may initiate a ProSe link (e.g., PC5 link) release procedure with the remote WTRU.

At 7, the relay may acknowledge the NAS command message by sending the SMF a message indicating acknowledgment (e.g., a PDU session modification command acknowledgment). The message may include a remote user ID.

Remote WTRU IP address(es) may be allocated by a DN-AAA during a PDU session secondary A&A.

A PDU session secondary A&A feature may include PDU session's IP address allocation by a DN-AAA.

In examples, a DN-AAA may provide a remote WTRU's IP address to a SMF. The SMF may provide the remote WTRU's IP address with the remote WTRU's ID to a relay WTRU. The relay WTRU may perform IP allocation (e.g., an IP allocation procedure) for the remote WTRU (e.g., IP prefix advertisement).

Figure 8:
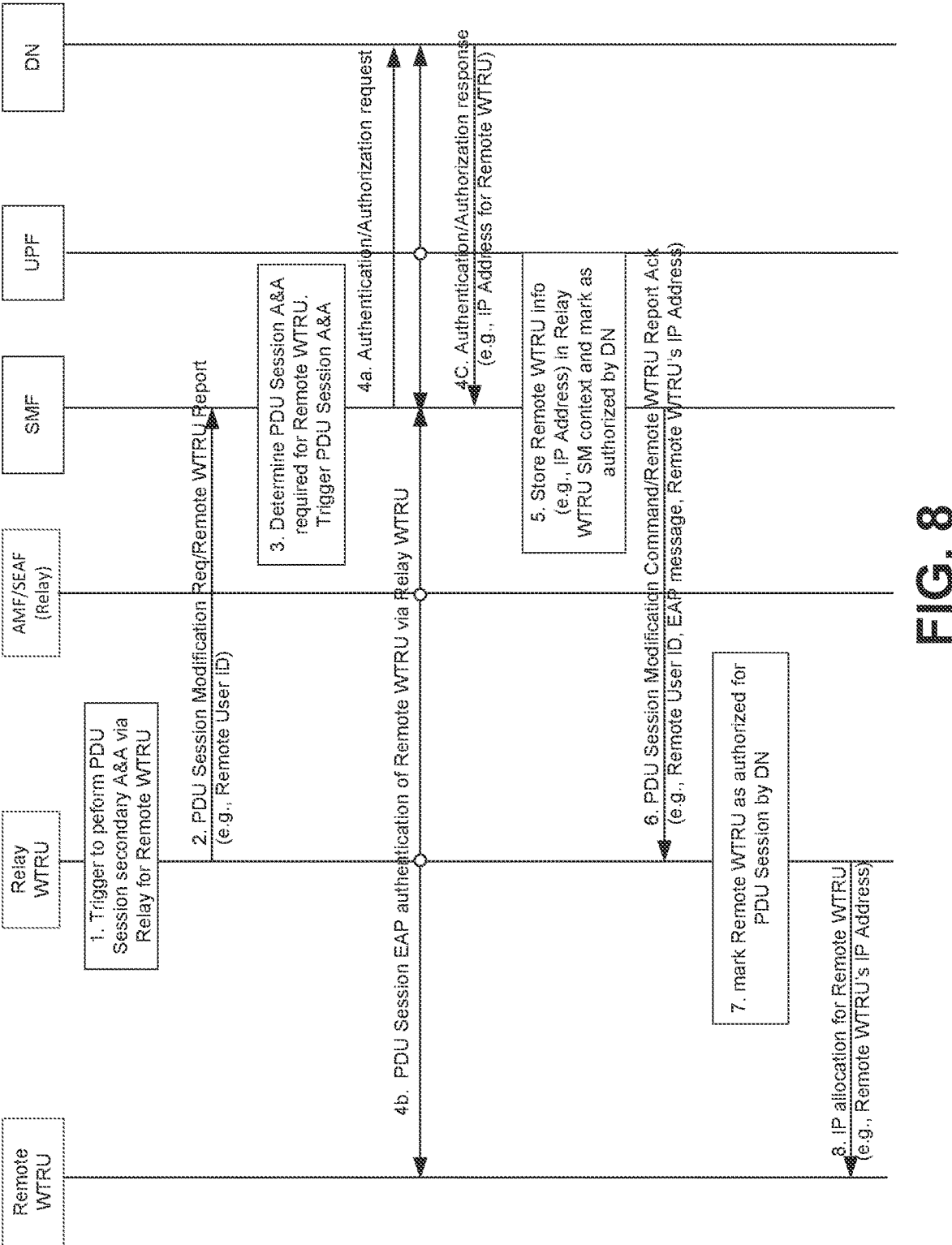
FIG. 8 is a diagram illustrating an example of PDU session secondary A&A via relay procedure with DN-AAA IP allocation.

FIG. 8 is a diagram illustrating an example of PDU session secondary A&A via relay procedure with DN-AAA IP allocation. FIG. 8 may include the behaviors and/or features described with respect to FIG. 3, and/or one or more of the following relay WTRU behaviors and SMF behaviors.

A relay WTRU's behaviors may include one or more of the following. The relay WTRU may receive a connectivity establishment request (e.g., a PC5 connection establishment request) from a remote WTRU. In examples, the connectivity establishment request may include a direct communication request message. The relay WTRU may determine that the connectivity establishment request from the remote WTRU uses a connectivity session (e.g., a PDU session) subject to secondary A&A, for example, based on the relay WTRU PDU session establishment performed by the relay with secondary A&A. The relay WTRU may send a pending IP allocation for the remote WTRU (e.g., a pending IP allocation for the remote WTRU until the secondary A&A is successful). The pending IP address allocation and/or indication may be sent to the remote WTRU via an accept message (e.g., a direct communication accept message). The relay WTRU may provide a remote user ID to the SMF (e.g., provide a remote user ID to the SMF without IP address). The relay WTRU may receive the remote WTRU's IP address from the SMF (e.g., via PDU session modification response and/or remote WTRU report acknowledgement). The relay WTRU may allocate an IP address for the remote WTRU. The IP address may be sent to the remote WTRU via a message (e.g., a link modification request message or a new PC5 message such as an IP address allocation).

A SMF's behaviors may include one or more of the following. The SMF may receive a remote WTRU's IP address from a DN-AAA (e.g., via an authentication and/or authorization response). The SMF may store the remote WTRU's IP address, for example, in a connectivity session (e.g., a PDU session) context. The SMF may send the remote WTRU's IP address to a network (NW) relay via PDU session modification response and/or remote WTRU report acknowledgment.

DN-authorized AMBR provided by a DN-AAA over a shared PDU session may be enforced.

An SMF may receive DN-authorized AMBR from a DN-AAA for the non-guaranteed bit rate (GBR) flow(s) in a connectivity session (e.g., a PDU session), for example, as part of the general secondary A&A procedure. The SMF may use the received DN authorized AMBR (e.g., as the input) to retrieve the authorized session AMBR from a Policy Control Function (PCF). In examples, the SMF may receive a DN authorization profile index (DAPI) (e.g., instead of DN-authorized AMBR) and the SMF may use the DAPI to retrieve the local configuration for QoS and/or to provide the DAPI (e.g., as input) to a PCF to retrieve the QoS configuration.

In the case where a relay WTRU and one or more remote WTRUs share a connectivity session (e.g., a PDU session) that may be subject to secondary A&A, one or more of the following may be used to enforce the session AMBR for the relay WTRU and remote WTRUs. An SMF may receive an initial DN-authorized AMBR and/or DAPI if the relay WTRU establishes a connectivity session (e.g., a PDU session) and performs secondary A&A (e.g., as described at 1 in FIG. 2). The relay WTRU may receive an initial session AMBR that's authorized by a PCF (e.g., taking DN-authorized AMBR and/or DAPI as input) or may retrieve the initial session AMBR from the local configuration (e.g., if DAPI may be received). If a remote WTRU is going to share the PDU session and secondary A&A is performed for the remote WTRU (e.g., at 4 in FIG. 3), the SMF may receive an updated DN-authorized AMBR and/or updated DAPI. A DN-AAA may be able to take into account that there are multiple WTRUs sharing a PDU session (e.g., the same PDU session) to increment the DN-authorized AMBR accordingly or to choose another DAPI. In examples, the DN-AAA may determine the updated DN-authorized AMBR or DAPI (e.g., new DN-authorized AMBR or DAPI). The SMF may provide the updated DN-authorized AMBR or DAPI to the PCF, may retrieve an updated session AMBR, or may retrieve the updated session AMBR (e.g., new session AMBR) from the local configuration, for example, as a result of the SMF's reception of the updated DN-authorized AMBR or updated DAPI. The SMF may provide the remote WTRU information (e.g., the number of remote WTRUs sharing the PDU session, WTRU identifiers of the remote WTRUs, etc.) to the PCF for retrieving an updated session AMBR. The updated session AMBR may be sent to the relay WTRU. The update of DN-authorized AMBR and the session AMBR may happen when (e.g., each time) a remote WTRU is added to share the PDU session. The relay WTRU may obtain (e.g., derive) the session AMBR for an involved remote WTRU (e.g., each involved remote WTRU), for example, based on the received session AMBR (e.g., from the SMF) and/or algorithm(s). In examples, if the received session AMBR is incremented an amount X (Mbps) after a remote WTRU is added to the PDU session, the relay WTRU may consider the amount X as the session AMBR for that remote WTRU. The relay WTRU may employ a more advanced algorithm(s) (e.g., one that takes into account the priority of the remote WTRU and/or one that derives the session AMBR for the remote WTRU based on a statistical model on remote WTRU and/or relay WTRU traffic). In examples, the relay WTRU may have a statistical model on remote WTRU traffic and its own traffic and may distribute the aggregate AMBR between themselves based on the model. The aggregate of the derived per-remote-WTRU AMBR (e.g., all the derived per-remote WTRU AMBR) may exceed the received session AMBR, for example, considering remote WTRUs may not send or receive traffic at the same time. The relay WTRU may send the derived per-remote-WTRU session AMBR to the remote WTRU over the ProSe connection (e.g., PC5 connection). The relay WTRU may enforce the session AMBR among the involved remote WTRUs (e.g., all the involved remote WTRUs) for the UL traffic of the connectivity session (e.g., PDU session). In examples, if the observed aggregate bit rates of the remote WTRUs exceed the session AMBR, the relay WTRU may choose to buffer some traffic from certain remote WTRUs. The relay WTRU may dynamically update (e.g., reduce) the per-remote-WTRU AMBR over the ProSe connection (e.g., PC5 connection) to throttle the traffic from the remote WTRUs. If a remote WTRU is removed from the connectivity session (e.g., as a result of authorization revocation) or after a re-authentication procedure, the SMF may receive an updated DN authorized AMBR and/or DAPI and may retrieve the updated session AMBR (e.g., from the PCF or locally). The relay WTRU may receive the updated session AMBR and/or re-calculate the derived per-remote-WRU AMBR.

Remote WTRU's secondary A&A may be performed using L3 U2NW and/or N3IWF.

During a PC5 link establishment procedure with a relay, the remote WTRU may determine to access a network. For example, the remote WTRU may determine to access a 5GC via N3IWF based on provisioned ProSe/WTRU route selection policy (URSP) policies. The connectivity service provided by the relay may be associated with a DN that is subject to a secondary authentication.

The remote WTRU and a relay may perform a network-controlled authorization to perform secondary A&A as described herein (e.g., as described with respect to FIG. 2 and FIG. 3).

In examples, if the remote WTRU receives a DCA message from the relay indicating that a secondary A&A is pending, the remote WTRU may refrain from establishing an IPSec connection with the N3IWF via the relay until the successful completion of the secondary A&A procedure.

In examples, if the remote WTRU receives an indication of successful secondary A&A (e.g., a PC5 message including a successful secondary A&A indication such as an EAP success as described herein), the remote WTRU may establish an IPSec connection, session, and/or tunnel with the N3IWF via the relay based on the determination that the secondary A&A procedure is completed successfully.

NSSAA via L3 U2NW relay may be performed. A link (e.g., a ProSe link or a PC5 link) may be set up with a relay using an S-NSSAI subject to NSSAA. During a link (e.g., ProSe link or PC5 link) establishment procedure between a remote WTRU and a relay, the relay may perform a network-controlled authorization (e.g., an enhanced network-controlled authorization) of a remote WTRU procedure to enable the remote WTRU to perform NSSAA for an S-NSSAI. The S-NSSAI subject to NSSAA may be associated with the connectivity service requested by the remote WTRU. The relay may provide the remote WTRU access to the S-NSSAI, for example, based on completion of the NSSAA procedure by the remote WTRU.

The relay's behaviors may include one or more of the following. The relay may receive a connection request (e.g., a PC5 connection request) from a remote WTRU that may include one or more of the remote WTRU's identity (e.g., SUCI), S-NSSAI, and/or the remote WTRU's NSSAA capabilities. The relay may determine that the S-NSSAI used by the ProSe connection (e.g., PC5 connection) may be subject to NSSAA based on a local configuration and/or prior NSSAA performed by the relay for that S-NSSAI. The relay may request authorization (e.g., from an AMF) for relay communication(s) for the remote WTRU via a request message (e.g., an NAS request message). The message may include one or more of the remote WTRU identity, requested S-NSSAI, and/or remote WTRU's NSSAA capabilities. The relay may transmit primary authentication message(s) between the AMF and the remote WTRU. The relay may receive a response message (e.g., an NAS response message) confirming successful authorization for relayed communication(s) for the remote WTRU. The response message may include one or more of key material bound to the S-NSSAI, a remote WTRU ID, an NSSAA status indication (e.g., success, pending, or required), and/or the S-NSSAI. The relay may forward to the remote WTRU the NSSAA status indication and/or the S-NSSAI subject to NSSAA via a ProSe (e.g., PC5) message (e.g., direct security mode command (DSMC)). The relay may trigger NSSAA for the remote WTRU with the serving AMF via a request message (e.g., an NAS request message) including the remote WTRU ID and/or the S-NSSAI. The relay may transmit NSSAA authentication message(s) between the AMF and the remote WTRU. Based on receiving an NAS message from the AMF indicating successful NSSAA for the remote WTRU, the relay may mark the S-NSSAI as allowed for the remote WTRU and/or may send a ProSe message (e.g., PC5 message) informing the remote WTRU of a successful NSSAA. The relay may proceed with connectivity session (e.g., PDU session) establishment, modification, and/or may relay data traffic between the remote WTRU and the network.

Figure 9:
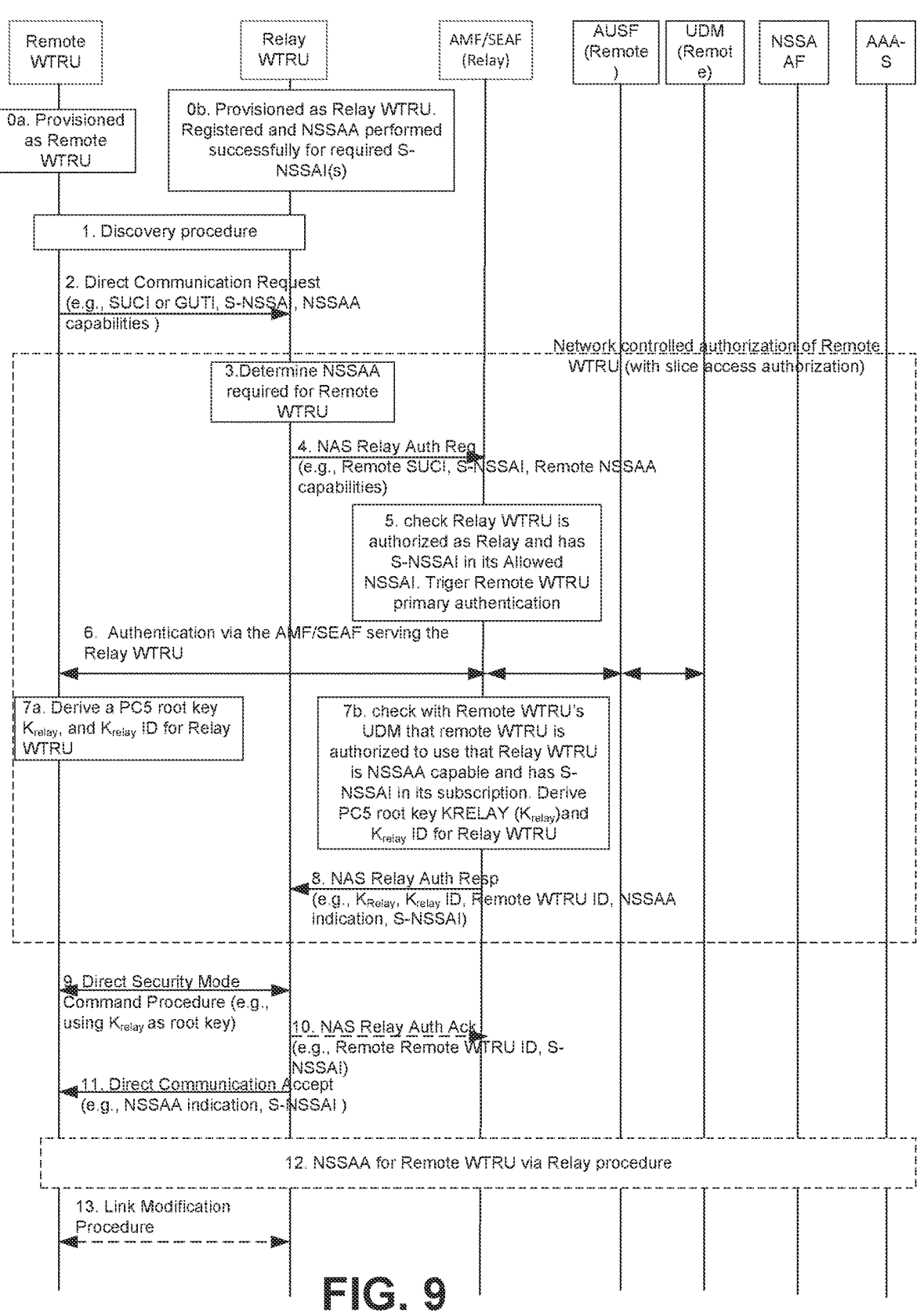
FIG. 9 is a diagram illustrating an example of ProSe (e.g., PC5) link setup with relay using S-NSSAI subject to NSSAA.

FIG. 9 is a diagram illustrating an example of ProSe (e.g., PC5) link setup with relay using S-NSSAI subject to NSSAA.

At 0a, a remote WTRU may be provisioned (e.g., with authorization parameters) to act as a remote WTRU. At 0b, a relay WTRU may be provisioned (e.g., with authorization parameters) to act as a relay WTRU. The relay may have been registered for the S-NSSA(s) associated with the services that are provided (e.g., broadcasted) by the relay, for example, including for the S-NSSAIs that are subject to NSSAA.

At 1, the remote WTRU and the relay may perform discovery (e.g., a discovery procedure).

At 2, the remote WTRU may determine (e.g., from the configuration provided at 0) that the relay service code and/or type discovered at 1 may be associated with an S-NSSAI that may be subject to NSSAA (e.g., based on an indication parameter for the S-NSSAI). The remote WTRU, e.g., based on this determination, may send a DCR message including one or more of a remote WTRU's subscription or network identity (e.g., SUPI or GUTI) and/or an indication of WTRU support for NSSAA. The remote WTRU may include the requested S-NSSAI. The remote WTRU may decide, for privacy protection reasons, whether to include the S-NSSAI in the DCR message, for example, based on a configuration parameter (e.g., one which may have been provided by the public land mobile network (PLMN) during a previous registration procedure). The configuration parameter may include access stratum connection establishment NSSAI inclusion mode.

At 3, the relay may determine that a network-controlled authorization of the remote WTRU with NSSAA may be used to provide the remote WTRU access to the slice based on the reception of the DCR message and/or the contents of the DCR message. The determination may be based on one or more of the following. The relay may have performed NSSAA for the S-NSSAI (e.g., as performed at 0). For example, during a NSSAA procedure, the S-NSSAI may be marked with an indication that it may be subject to NSSAA. Based on the configuration from 0, the service provided may be associated with an S-NSSAI that may be subject to NSSAA (e.g., based on an indication parameter for the S-NSSAI). A network-controlled authorization of remote WTRU (e.g., with slice access authorization) may include 3-8.

At 4, the relay may decide to trigger a network-controlled authorization of the remote WTRU on the condition that the DCR message includes a SUCI or GUTI. In examples, the relay may send an identity request message to the remote WTRU, for example, to obtain the remote WTRU identity used to perform a network-controlled authorization (e.g., an authorization procedure) of the remote WTRU. The relay may send a request message (e.g., a NAS relay authorization request message) that includes one or more of the remote WTRU ID (e.g., SUCI), the S-NSSAI, and/or remote WTRU's NSSAA capabilities to an AMF/security anchor function (SEAF).

At 5, the AMF may determine (e.g., check to determine) that the relay may be authorized to act as a relay and may be authorized to access or provide access to the S-NSSAI (e.g., the S-NSSAI may be part of the relay's WTRU allowed NSSAI). The AMF may decide to trigger a primary authentication procedure via the relay for the remote WTRU based on the determination (e.g., upon a successful check).

At 6, the remote WTRU may perform a primary authentication procedure via the relay. Authentication message(s) may be transported over NAS message(s) between the AMF and the relay. The NAS message(s) may include an indication (e.g., the remote WTRU's GPSI, a remote user ID, or any ID provided by the remote WTRU in the message at 2 to identify the remote WTRU) that the authentication messages are for the remote WTRU. The relay may forward the messages (e.g., transparently between the remote WTRU and the AMF).

At 7b, the AMF may determine (e.g., check with the remote WTRU's unified data management (UDM)) that the remote WTRU may be authorized to use the relay and/or has the S-NSSAI as part of its subscription based on a successful authentication procedure. The AMF may verify that the remote WTRU supports NSSAA (e.g., from the capabilities received from the relay), for example, if the S-NSSAI is subject to NSSAA. The AMF may register with the remote WTRU's UDM (e.g., including information about the serving relay) to handle UDM subscription notification(s) (e.g., further UDM subscription notification(s)) and/or to handle revocation and/or re-authentication request(s) for remote WTRU(s) from AAA-S(s). The AMF may generate material (e.g., key material) to authorize and/or enable secure communication(s) between the relay and the remote WTRU following successful subscription-based authorization check(s). The generated key material may be obtained (e.g., derived) from the key material generated during the primary authentication with the remote WTRU. The generated key material may be bound to the S-NSSAI, for example, to enable a strict enforcement of network slice access authorization (e.g., restrict the relay communication(s) between the remote WTRU and the relay to the particular slice). At 7a, the remote WTRU may generate key material for securing communication with the relay (e.g., using a similar or the same way as the AMF), for example, based on a successful authentication procedure.

The remote WTRU may have performed successfully or initiated NSSAA for the S-NSSAI from a previous registration with the relay WTRU's AMF or another AMF. In such a case, the relay WTRU's AMF may retrieve the current NSSAA status from the remote WTRU context (e.g., from its local storage or from the remote WTRU's serving AMF as described in one or more examples herein such as the example shown in FIG. 14).

At 8, the AMF may send a response message (e.g., an NAS response message) that includes one or more of the remote WTRU ID (e.g., GPSI or SUPI), the generated key material, the S-NSSAI, and/or an indication for an NSSAA status (e.g., the current NSSAA status) based on a successful authentication procedure. The indication may indicate that NSSAA is to be performed, ongoing, or successful (e.g., if initiated or performed successfully from a previous registration) for the given S-NSSAI. If the primary authentication and/or subscription-based authorization check fails, the response message may indicate a failure cause (e.g., the S-NSSAI not authorized for the remote WTRU).

At 9, the relay may establish the ProSe link (e.g., PC5 link) security with the remote WTRU, for example, using the key material generated from 7. In examples, 9 may be skipped in case of a failure indication via the message at 8.

At 10, the relay may send an acknowledgment message (e.g., to the AMF) to confirm the ProSe link (e.g., PC5 link) security establishment. The AMF may trigger the NSSAA procedure based on the reception of the message as described with respect to FIG. 10.

At 11, the relay may send to the remote WTRU a DCA message including one or more of an indication for an NSSAA status (e.g., a pending status, a required status, a successful status, and the like) and/or the S-NSSAI. In case of a failure indication via the message at 8, the relay may send a reject message to the remote WTRU (e.g., including the failure cause). The relay may allocate an IP address and/or IPv6 prefix for the remote WTRU. The relay may configure a traffic filter (e.g., as a default filter for IP or non-IP traffic) for the PC5 link to prevent data traffic (e.g., any data traffic) until a successful completion of subsequent NSSAA procedure(s) (e.g., as shown at 12) and (e.g., if not already established) a successful PDU session establishment by the relay using the given S-NSSAI (e.g., which may be indicated by the message at 13). Based on the indication in the DCA message, the remote WTRU may refrain from sending data traffic (e.g., any data traffic) over the PC5 link until a successful completion of a subsequent NSSAA (e.g., after 13). For example, the remote WTRU may determine that the subsequent NSSAA is completed sand may send data traffic over the PC5 link based on the determination of the successful completion of the subsequent NSSAA.

Figure 10:
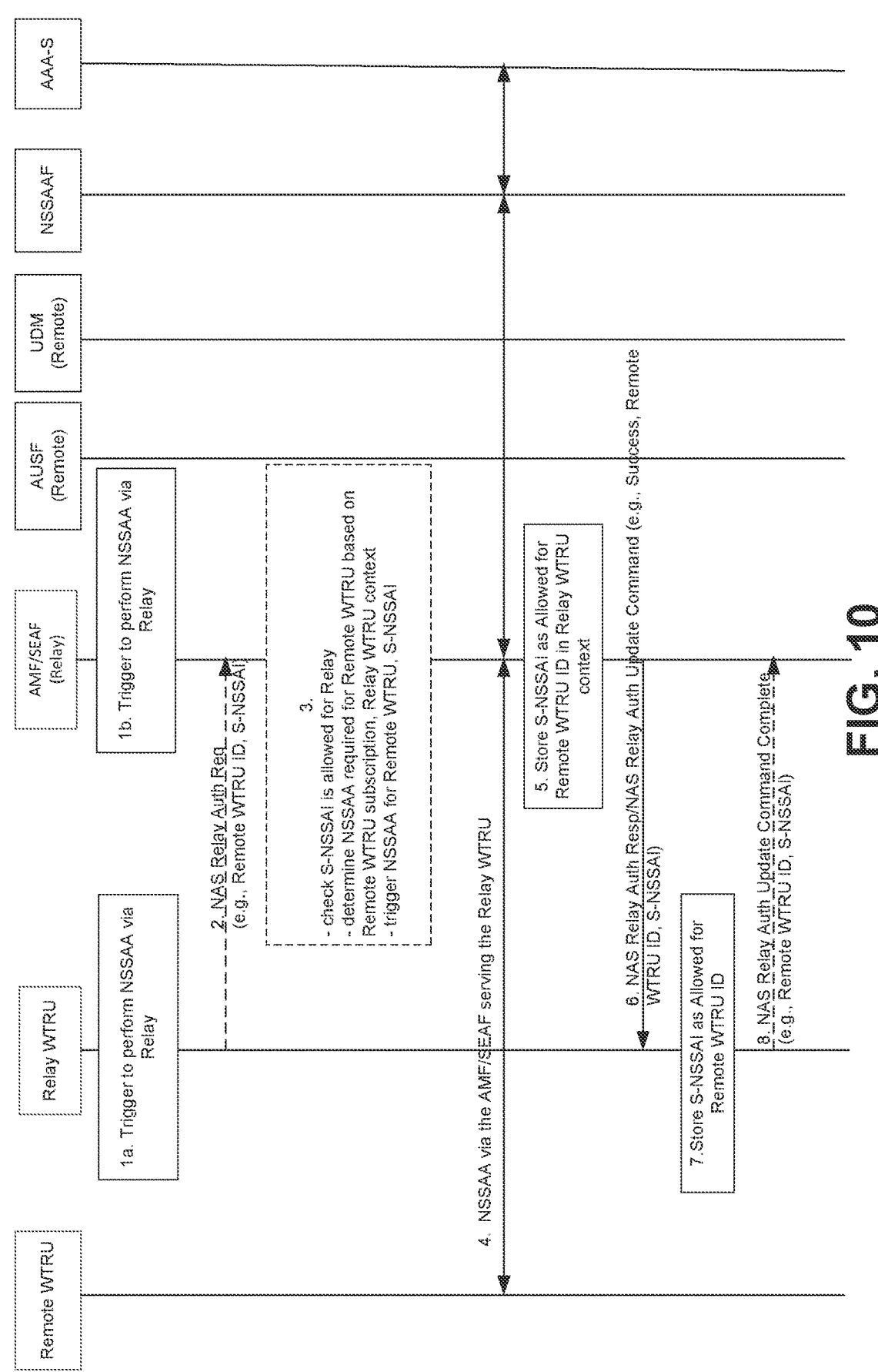
FIG. 10 is a diagram illustrating an example of a NSSAA via relay procedure.

At 12, if NSSAA is to be performed (e.g., requested), an NSSAA procedure for the remote WTRU via relay may be triggered by the relay (e.g., as described with respect to FIG. 10).

At 13, the relay may send a ProSe message (e.g., a PC5 link modification request) that includes a successful NSSAA indication and/or the S-NSSAI, for example, based on a successful completion of the NSSAA (e.g., NSSAA procedure). The relay may allocate an IP address and/or IPv6 prefix for the remote WTRU (e.g., if none were allocated at 11) to be used with the established connectivity session (e.g., the established PDU session). If the NSSAA fails, the relay may release the ProSe (e.g., PC5) link, e.g., indicating the failure cause.

In examples, the NSSAA (e.g., 12 in FIG. 9) over relay procedure may be performed before 11 in FIG. 9. Based on a successful NSSAA (e.g., NSSAA procedure), the relay may send a DCA message that includes a successful NSSAA indication and/or the S-NSSAI. In examples, if the NSSAA fails, the relay may send a reject message (e.g., the PC5 reject message) indicating the failure cause.

FIG. 10 is a diagram illustrating an example of an NSSAA via relay procedure.

Figure 11:
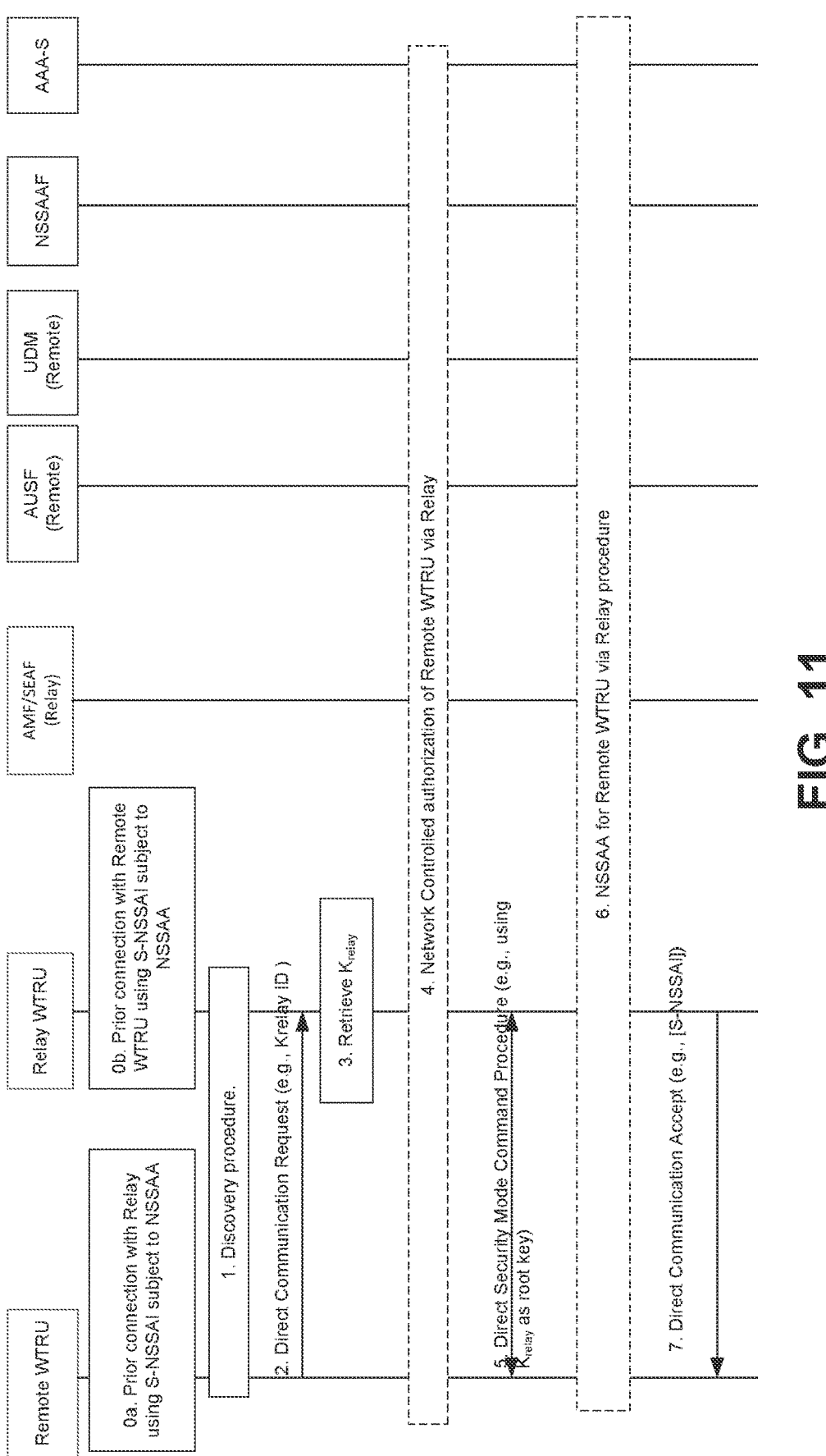
FIG. 11 is a diagram illustrating an example of a remote WTRU reconnection to a relay WTRU using S-NSSAI subject to NSSAA with a prior authorization.

At 1a or 1b, a relay WTRU and/or an AMF may decide to trigger an NSSAA (e.g., NSSAA procedure) for the remote WTRU based on one or more conditions, for example, as determined in FIG. 11 or FIG. 9. In examples, if NSSAA is triggered by the AMF, 2 and 3 in FIG. 10 may be skipped. In examples, if NSSAA is triggered by the relay, 8 in FIG. 10 may be skipped.

At 2, the relay may send a request message (e.g., an NAS request message to the AMF) that includes the remote WTRU ID (e.g., SUPI and/or GPSI) and/or S-NSSAI.

At 3, the AMF may determine (e.g., check to determine) that the relay may be authorized to act as a relay and may be authorized to access or provide access to the S-NSSAI (e.g., the S-NSSAI may be part of the relay WTRU's allowed NSSAI) and/or that NSSAA may be performed for the remote WTRU to use the S-NSSAI (e.g., based on the NSSAA status associated with the S-NSSAI/remote WTRU stored in the relay WTRU context). The AMF may decide to trigger a primary authentication procedure via the relay for the remote WTRU, for example, based on the determination (e.g., based on a successful check).

At 4, the remote WTRU may perform NSSAA (e.g., an NSSAA procedure) via the relay. Authentication message(s) may be transported over NAS message(s) between the AMF and the relay. The NAS message(s) may include an indication (e.g., the remote WTRU's GPSI and/or SUPI), for example, to indicate to the relay that the authentication message(s) are for the remote WTRU. The relay may forward the messages (e.g., transparently) between the remote WTRU and the AMF. The AMF may receive authorization information (e.g., a time limit) from an AAA-S for the remote WTRU to use the S-NSSAI.

At 5, the AMF may update the S-NSSAI state associated with the remote WTRU in the relay WTRU context (e.g., mark the S-NSSAI as allowed for the remote WTRU) based on a successful NSSAA procedure.

At 6, the AMF may send a message (e.g., an NAS message) to the relay indicating the result of the NSSAA (e.g., procedure), for example, including an identity of the remote WTRU and/or the S-NSSAI. The AMF may provide the authorization information for the remote WTRU's usage of the S-NSSAI as provided by the AAA-S. The message may include an NAS relay authorization response and/or an NAS relay authorization update command.

At 7, the relay may mark the remote WTRU as authorized for the S-NSSAI and/or store authorization information (e.g., any authorization information) for the remote WTRU's usage of the S-NSSAI on the condition of a successful NSSAA.

At 8, the relay may send a message (e.g., an NAS message) to acknowledge the message received at 6 from the AMF. The message at 8 may be an NAS relay authorization update command complete message. The message may include the remote WTRU ID and/or the S-NSSAI.

The relay WTRU may proceed with the rest of ProSe link (e.g., PC5 link) setup with relay using S-NSSAI subject to NSSAA, for example, as described with respect to FIG. 11 or FIG. 9.

Reconnection to relay using S-NSSAI subject to NSSAA may be performed.

During a ProSe link (e.g., PC5 link) reconnection procedure between a remote WTRU and a relay using network-controlled authorization, a relay may enable a remote WTRU to get access to an S-NSSAI authorized from a prior successful completion of NSSAA (e.g., procedure) and/or to perform the NSSAA via the relay.

During a PC5 link reconnection procedure with network-controlled authorization, the relay may determine whether the remote WTRU may be authorized for using the S-NSSAI subject to NSSAA, for example, based on locally stored slicing information associated with the remote WTRU (e.g., retrieved based on Krelay ID provided by the remote WTRU). In examples, if the remote WTRU is not authorized for the S-NSSAI, the relay may trigger NSSAA for the remote WTRU with the serving AMF via a request message (e.g., an NAS request message including a remote WTRU ID and/or the S-NSSAI). If the S-NSSAI is marked as rejected, the relay may reject the link establishment request. If the relay decides to trigger NSSAA with the AMF, the relay may perform a procedure based on one or more examples described herein such as the example described with respect to FIG. 9 or FIG. 10.

FIG. 11 is a diagram illustrating an example of a remote WTRU reconnection to a relay WTRU using S-NSSAI subject to NSSAA with a prior authorization.

At 0a and 0b, a remote WTRU and a relay may have established a prior connection using an S-NSSAI subject to NSSAA. Following the link release, the relay may have informed an AMF about the link release. The relay WTRU may keep one or more of a Krelay ID, and/or associated S-NSSAI authorization information, for example, based on an AMF reply.

At 1, the remote WTRU and the relay may perform discovery (e.g., a discovery procedure).

At 2, the remote WTRU may send a DCR message including one or more of a remote WTRU's subscription or network identity (e.g., SUPI or GUTI), an indication of WTRU support for NSSAA, and Krelay ID. The remote WTRU may include the requested S-NSSAI.

At 3, the relay may retrieve Krelay using Krelay ID. In examples, if an associated valid S-NSSAI authorization information for the remote WTRU is available, the relay may skip 4 and 6 in FIG. 11.

Figure 14:
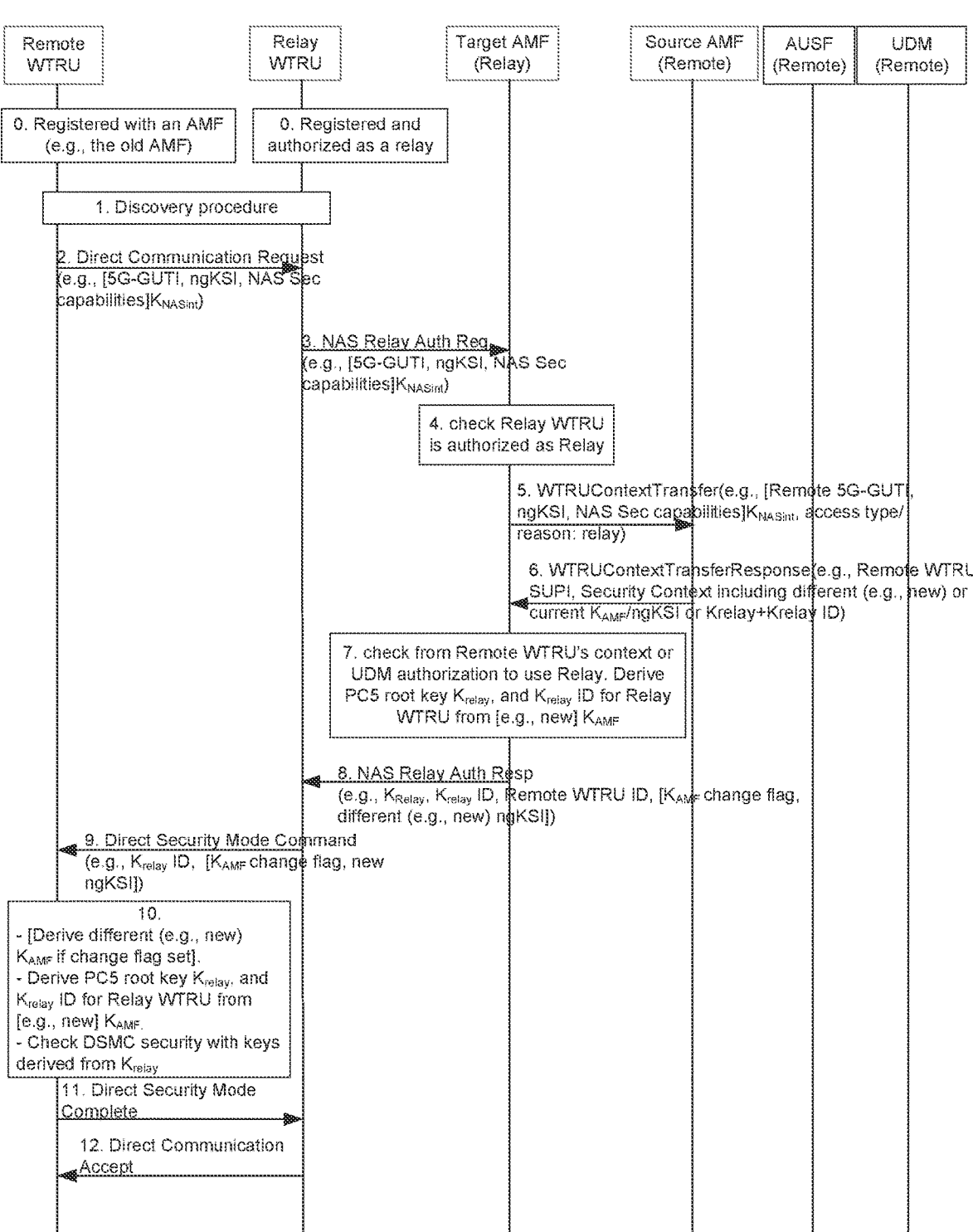
FIG. 14 is a diagram illustrating an example of ProSe (e.g., PC5) link setup with relay using remote WTRU 5G native security context.

At 4, the relay may initiate a network-controlled authorization (e.g., via relay) of the remote WTRU (e.g., as described with respect to FIG. 9 or FIG. 14).

At 5, the relay may establish the ProSe link (e.g., PC5 link) security using the Krelay from the previous connection or a different Krelay (e.g., the new Krelay if received during 4).

At 6, the NSSAA (e.g., procedure) for the remote WTRU via relay may be performed (e.g., as described with respect to FIG. 10).

At 7, the relay may send a DCA message that includes a successful NSSAA indication, the S-NSSAI, or a reject message (e.g., a PC5 reject message) indicating the failure cause.

Revocation of an authorization to use an S-NSSAI subject to NSSAA via a relay may be performed by AAA.

During a procedure for S-NSSAI authorization revocation by AAA, the relay may enable revocation of an authorization for a remote WTRU to use an S-NSSAI that was authorized from a prior successful completion of NSSAA procedure via the relay with a network-controlled authorization.

During an S-NSSAI authorization revocation by AAA, the relay may receive a message (e.g., an NAS command message) from an AMF including the remote WTRU ID and S-NSSAI, for example, indicating a revocation of authorization for the remote WTRU to use the S-NSSAI. The relay may perform one or more of the following: discard S-NSSAI information locally stored and associated with the remote WTRU, mark/store S-NSSAI as rejected for the remote WTRU, discard the information (e.g., all information) associated with the remote WTRU including key material from a prior network-controlled authorization procedure (e.g., if the key material is bound to the S-NSSAI). The relay may perform a direct link release procedure with the remote WTRU and/or inform the remote WTRU via a ProSe message (e.g., PC5 message) that the authorization for the S-NSSAI has been revoked. The relay may send an NAS command acknowledgment message to the AMF to confirm the S-NSSAI revocation in the relay.

Figure 12:
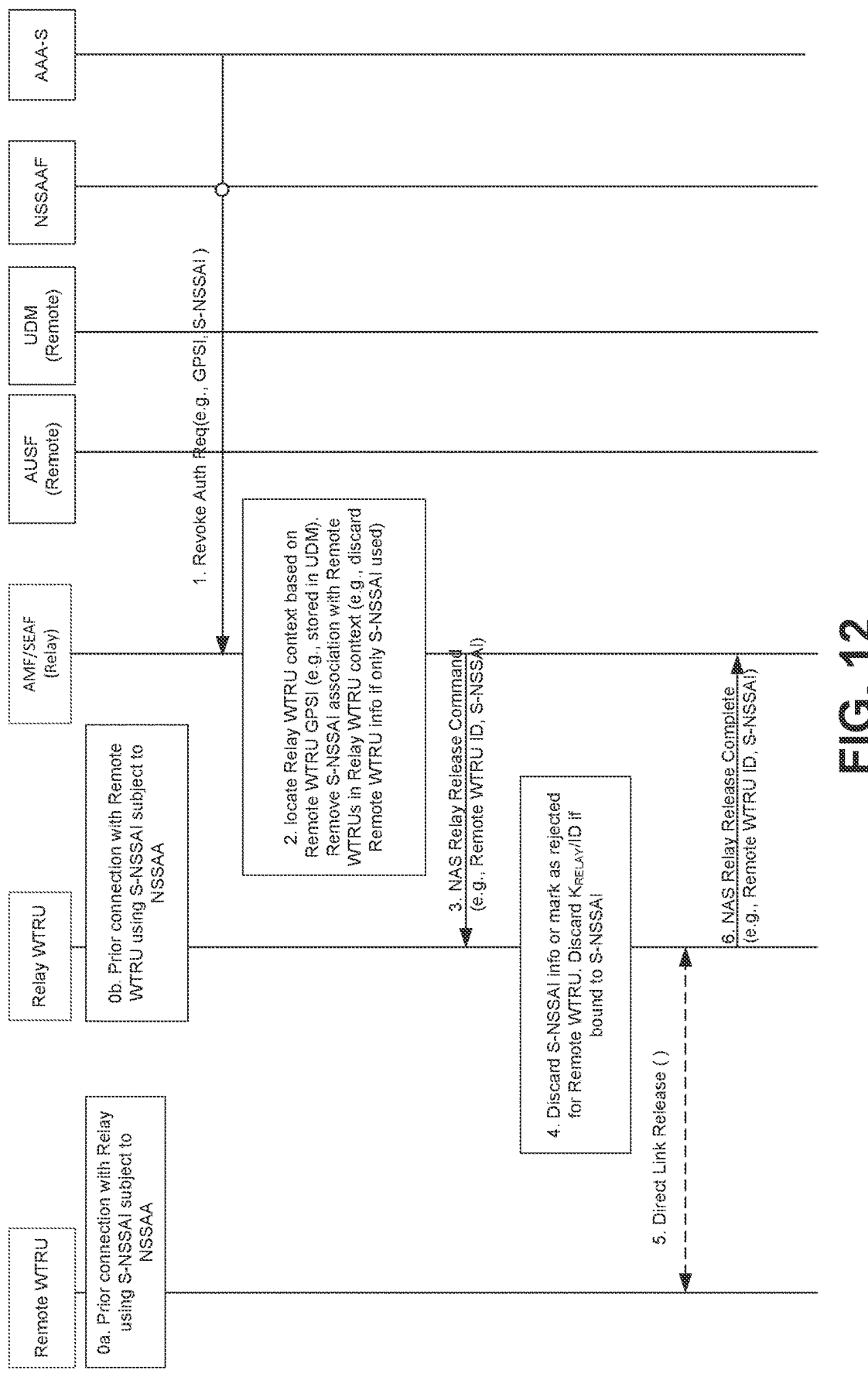
FIG. 12 is a diagram illustrating an example of revocation of a remote WTRU using S-NSSAI subject to NSSAA via relay WTRU.

FIG. 12 is a diagram illustrating an example of revocation of a remote WTRU using S-NSSAI subject to NSSAA via relay WTRU.

At 0a and 0b, a remote WTRU may be connected to a relay WTRU using an S-NSSAI subject to NSSAA.

At 1, an AMF may receive a revocation request from an AAA-S, for example, via a network slice specific authentication and authorization function (NSSAAF). The request may include the GPSI of the remote WTRU. The NSSAAF may request UDM to get the AMF ID of the AMF serving the remote WTRU. The NSSAAF may obtain an identity of the relay when querying the UDM. In such a case, the NSSAAF may provide the AMF with the relay WTRU identity (e.g., SUPI and/or GPSI).

At 2, the AMF may locate a relay WTRU context based on the identity(ies) provided by the NSSAAF. The AMF may remove an association of the remote WTRU with the S-NSSAI (e.g., an NSSAA status) in the relay WTRU context. In examples, if no other S-NSSAI is used for the remote WTRU, the AMF may remove the remote WTRU information from the relay WTRU context. The AMF may de-register from the remote WTRU's UDM, for example, if the remote WTRU information is removed from the relay WTRU context.

At 3, the AMF may send a message (e.g., an NAS command message) to the relay including the remote WTRU ID (e.g., GPSI and/or SUPI) and/or S-NSSAI to revoke an authorization of the remote WTRU to use S-NSSAI.

At 4, the relay WTRU may discard S-NSSAI authorization information associated with the remote WTRU and/or may mark the S-NSSAI authorization information as rejected for the remote WTRU. If a Krelay and/or ID is bound to S-NSSAI, the relay may discard the Krelay and/or ID.

At 5, the relay may initiate a link release procedure, for example, if the remote WTRU is connected to the relay.

At 6, the relay may send a message (e.g., an NAS message) to acknowledge the reception of the message at 3 to the AMF. The message may be an NAS relay release complete message. The message may include a remote WTRU ID and/or the S-NSSAI.

The re-authentication and/or authorization procedure may use one or more of 0a, 0b, and 1-6 in FIG. 12. In examples, a re-authentication and/or authorization procedure may be similar to the authorization revocation procedure except for one of more of the following differences: the AMF may trigger NSSAA of the remote WTRU via relay procedure (e.g., as described with respect to FIG. 10), for example, based on receiving a re-authentication request from the AAA-S or if re-authentication fails, 3, 4, 5 and/or 6 in FIG. 12 may be performed.

Figure 13:
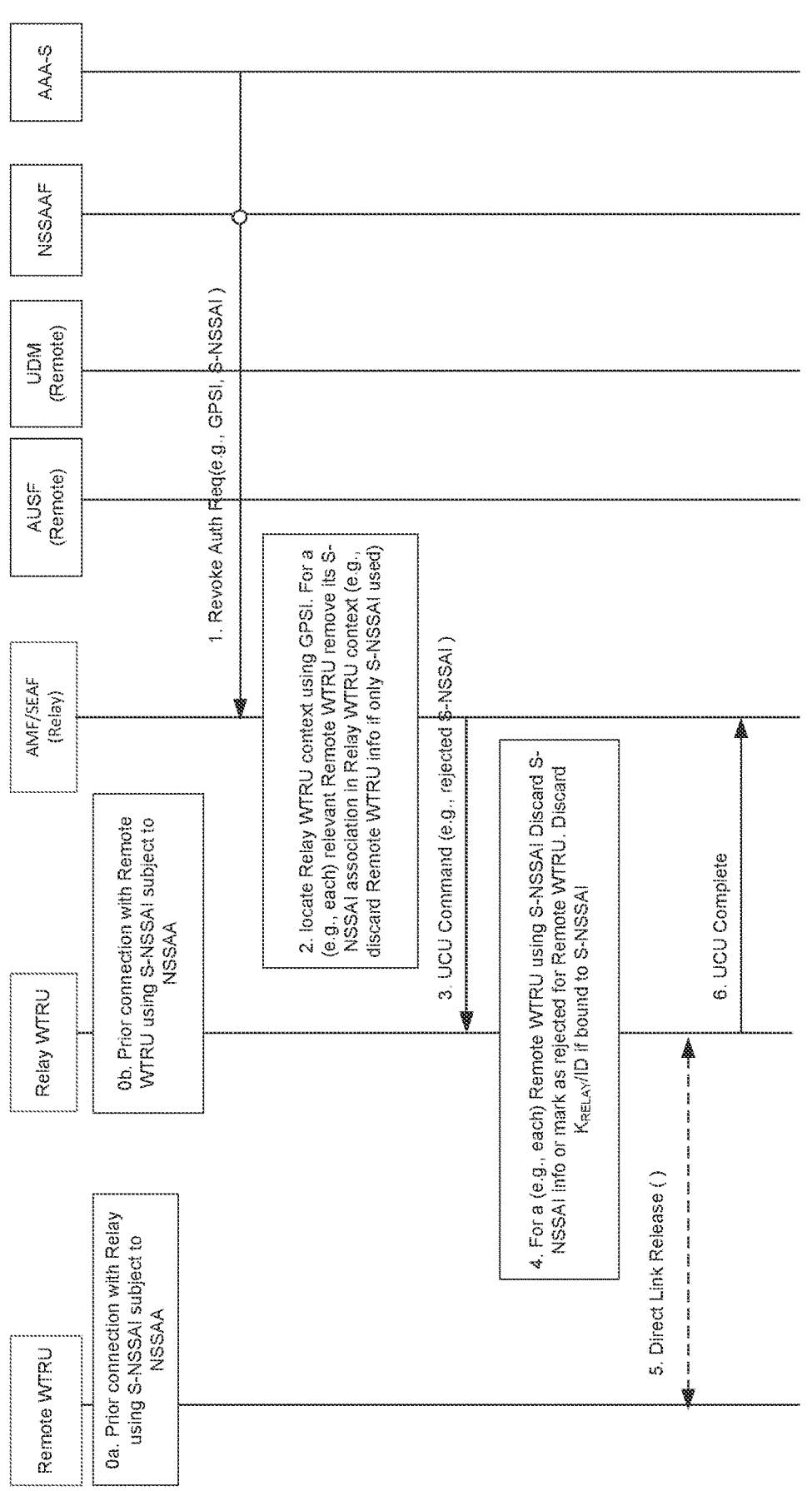
FIG. 13 is a diagram illustrating an example of revocation of a relay WTRU using S-NSSAI subject to NSSAA via relay WTRU.

FIG. 13 is a diagram illustrating an example of revocation of a relay WTRU using S-NSSAI subject to NSSAA via relay WTRU.

At 0a and 0b, a remote WTRU may be connected to the relay WTRU using an S-NSSAI subject to NSSAA.

At 1, an AMF may receive a revocation request from an AAA-S via an NSSAAF. The request may include the GPSI of the relay WTRU and/or S-NSSAI. The NSSAAF may request a UDM to get (e.g., retrieve) the ID of the AMF serving the relay WTRU.

At 2, the AMF may locate the relay WTRU context based on the identity(ies) provided by the NSSAAF. For a remote WTRU (e.g., each remote WTRU) associated with the revoked S-NSSAI, one or more of the following may be performed: the AMF may remove the association of the remote WTRU with the S-NSSAI (e.g., NSSA status) from the relay WTRU context, if no other S-NSSAI may be used for the remote WTRU, the AMF may remove the remote WTRU information from the relay WTRU context; or the AMF may de-register from the remote WTRU's UDM if remote WTRU information may be removed from the relay WTRU context.

At 3, the AMF may initiate a UCU procedure with the relay to revoke the authorization for the relay to use the S-NSSAI.

At 4, for a remote WTRU (e.g., each remote WTRU) associated with the revoked S-NSSAI, one or more of the following may be performed: the relay WTRU may discard S-NSSAI authorization information associated with the remote WTRU, or if the Krelay is bound to the S-NSSAI, the relay may discard the S-NSSAI.

At 5, for a remote WTRU (e.g., each remote WTRU) connected to the relay and associated with the revoked S-NSSAI, the relay may initiate a link release procedure.

At 6, the relay may send a message (e.g., an NAS message such as UCU complete) to acknowledge the message received at 3.

Remote WTRU's NSSAA may be performed using L3 U2NW and/or N3IWF.

During a PC5 link establishment procedure with a relay, the remote WTRU may determine to access a network. For example, the remote WTRU may determine to access a 5GC via N3IWF, for example, based on provisioned ProSe/URSP policies. The connectivity service provided by the relay may be associated with an S-NSSAI subject to NSSAA.

The remote WTRU and/or the relay may perform an enhanced network-controlled authorization procedure to perform NSSAA as described herein (e.g., as described with respect to FIG. 9 and FIG. 10).

In examples, if the remote WTRU receives a DCA message from the relay indicating that NSSAA is pending, the remote WTRU may refrain from establishing an IPSec connection with the N3IWF via the relay until the successful completion of an NSSAA procedure.

In examples, if the remote WTRU receives an indication of a successful NSSAA, (e.g., a PC5 message including a successful NSSAA indication as described herein), the remote WTRU may establish an IPSec connection, session, and/or tunnel with the N3IWF via the relay based on the determination of the successful completion of the NSSAA procedure.

Connection via L3 WTRU2NW relay may be established using a security context, which may be a 5G native security context.

During a ProSe link (e.g., PC5 link) connection procedure between a remote WTRU and a relay using a network-controlled authorization, a relay may enable a remote WTRU to get access to the network via the relay following a prior successful registration procedure by using its security context, which may be a 5G native security context.

The remote WTRU may have registered with the network and established a security context, such as a 5G native security context. The remote WTRU may perform discovery (e.g., a discovery procedure) with the relay WTRU and decide to connect with the relay using its security context, which may be a 5G native security context. The remote WTRU may send a DCR message to the relay, for example, including one or more of the following parameters: the remote WTRU's core network identity (e.g., a GUTI, which may be a 5G-GUTI), key set identifier (e.g., in 5G) (ngKSI) identifying the key (e.g., a KAMF, which may be a key shared with an AMF) being used, and/or the remote WTRU's NAS security capabilities. The parameters may be included in an integrity protected message (IPM), for example, protected using remote WTRU's security context, which may be 5G native security context, (e.g., with key $K_{NASint}$). In examples, the remote WTRU may provide its core network identity in response to an identity request message from the relay and/or network. The remote WTRU may receive a message (e.g., a DSMC message) from the relay that may include a Krelay ID and/or a set of security parameters forwarded from the network (e.g., the AMF) that may include one or more of a KAMF key change flag, an ngKSI identifying the KAMF to be used, or the remote WTRU's security capabilities (e.g., sent via the DCR). If the KAMF change flag is set, the remote WTRU may obtain (e.g., derive) a second KAMF from the first KAMF indicated by the value of ngKSI. In examples, the second KAMF may be a new KAMF. The remote WTRU may obtain (e.g., derive) a Krelay and Krelay ID based on the first KAMF (e.g., existing KAMF) or the obtained KAMF (e.g., newly derived and/or second KAMF). The remote WTRU may verify the DSMC message security, which may include determining (e.g., checking) that the received remote WTRU NAS security capabilities match the ones sent to the relay via the connection request message. The remote WTRU may verify the integrity protection of the DSMC message using an integrity key, for example, obtained based on the Krelay indicated by the Krelay ID. If the security verification is successful, the remote WTRU may send a direct security mode complete message to the relay with security protection (integrity and/or confidentiality, using security keys obtained based on Krelay). The remote WTRU may receive a DCA message successfully completing the ProSe link (e.g., PC5 link) establishment.

FIG. 14 is a diagram illustrating an example of ProSe link (e.g., PC5 link) setup with relay using a remote WTRU security context, which may be a 5G native security context.

At 0, a remote WTRU may have registered with the network and may establish a security context, which may be a 5G native security context, with an AMF (e.g., a source AMF). The relay WTRU may be registered and/or authorized to operate as a relay.

At 1, the remote WTRU may perform discovery (e.g., a discovery procedure) with a relay WTRU and decide to connect with the relay using its security context, which may be a 5G native security context.

At 2, the remote WTRU may send a DCR message to the relay including one or more of the following parameters: the remote WTRU's core network identity (e.g., a GUTI, which may be a 5G-GUTI), ngKSI identifying the KAMF being used, or the remote WTRU's NAS security capabilities. The parameters may be included in an IPM protected using remote WTRU's security context, which may be a 5G native security context (e.g., with key $K_{NASint}$). In examples, the remote WTRU may provide its identity in response to an identity request message from the relay.

At 3, the relay may send the remote WTRU GUTI, which may be a 5G-GUTI, and/or the remote WTRU's IPM to the relay WTRU's serving AMF (e.g., the target AMF) via a request message (e.g., an NAS request message), for example, for relay authorization.

At 4, the target AMF may determine (e.g., check to determine) that the relay may be authorized to act as a relay.

At 5, the target AMF may identify the source AMF serving the remote WTRU, for example, using the provided GUTI, which may be a 5G-GUTI. In examples, if the source and target AMFs are different, the target AMF may send a request message to the source AMF to obtain security parameter(s) for the remote WTRU from the source AMF. The target AMF may include the remote WTRU's IPM and/or the remote WTRU's identity received from the relay. The target AMF may indicate that the access type and/or reason for the request are for relay access. If the source and target AMFs are the same (e.g., remote WTRU is registered with target AMF), the target AMF may retrieve the remote WTRU context directly from its local storage (e.g., 5 and 6 in FIG. 14 may be skipped).

At 6, the source AMF may locate the remote WTRU's security context using the received remote WTRU's GUTI, which may be a 5G-GUTI. The source AMF may evaluate (e.g., check) the integrity protection of the remote WTRU's IPM using the remote WTRU's security context. In examples, if the security check(s) are successful, the source AMF may obtain (e.g., derive) a Krelay and Krelay ID from KAMF identified by the ngKSI. If the security checks are not successful, the source AMF may generate a different security context, (e.g., new 5G security context). The source AMF may send a response message to the target that includes the remote WTRU SUPI. The message may include, for example, Krelay and Krelay ID, a different security context, which may be a different 5G security context (e.g., new 5G security context), to be used for the remote WTRU with a KAMF change indication or the current remote WTRU's security context, which may be a 5G security context.

At 7, the target AMF may check the remote WTRU's context (e.g., if provided by the source AMF) or with the remote WTRU's UDM (e.g., using provided SUPI) for authorization to use the relay. If not provided by the source AMF, the target AMF may obtain (e.g., derive) a Krealy and Krelay ID using the remote WTRU's security context.

At 8, the target AMF may send a response message (e.g., an NAS response message) to the relay that includes the remote WTRU ID (e.g., GPSI and/or SUPI) and/or Krealy and Krelay ID. The message may include a KAMF change flag and/or a different ngKSI (e.g., new ngKSI) if a different security context (e.g., new security context) was generated by the source AMF previously.

At 9, the relay may send a DSMC message to the remote WTRU that includes one or more of Krelay ID, the KAMF change flag, and/or the different ngKSI if provided by the target AMF. The message may be integrity protected, for example, using a security key derived based on Krelay.

At 10, if the KAMF change flag is set, the remote WTRU may obtain a different KAMF (e.g., derive a new KAMF) from the KAMF indicated by the value of ngKSI. The remote WTRU may obtain (e.g., derive) a Krelay and Krelay ID from a first KAMF (e.g., existing KAMF) or the obtained (e.g., KAMF (e.g., newly derived and/or second KAMF). The remote WTRU may verify the DSMC message security, for example, using security keys obtained based on Krelay.

At 11, if the security verification is successful, the remote WTRU may send a direct security mode complete message to the relay with security protection (e.g., integrity and/or confidentiality) using security keys obtained based on Krelay.

At 12, the remote WTRU may receive a DCA message completing the ProSe link (e.g., PC5 link) establishment.

The procedure described herein may be combined with the NSSAA via relay procedure as described with respect to FIG. 9. In examples, if the service provided by the relay is associated with an S-NSSAI subject to NSSAA, the target AMF may retrieve slicing authorization information (e.g., allowed NSSAI and/or NSSAA status) from the source AMF that holds the remote WTRU context (e.g., as shown at 5 and 6 in FIG. 14). The NSSAA procedure as described with respect to FIG. 10 may be skipped based on whether the S-NSSAI is allowed pending NSSAA etc. For example, if the S-NSSAI subject to NSSAA is allowed (e.g., already allowed) for the remote WTRU, or NSSAA is pending (e.g., ongoing), the AMF may determine to not initiate an NSSAA procedure for the remote WTRU as described in FIG. 10. The AMF may grant the remote WTRU with access to the slice as part of the ProSe link setup or may wait until successful completion of NSSAA procedure, respectively.

FIG. 15 illustrates an example 1500 of a link setup with a relay using a connectivity session subject to a secondary A&A. At 1502, a relay WTRU may receive a direct communication request (DCR) from a remote WTRU requesting connectivity service (e.g., connectivity session parameters such as S-NSSAI, data network name (DNN), and/or the like). At 1504, the relay may determine that a connectivity session for the service is subject to a secondary A&A, for example, based on an indication associated with the connectivity session if already established and/or an indication associated DN from relay proximity service (ProSe) configuration. At 1506, e.g., based on the determination, the relay may trigger a network-controlled authorization for the remote WTRU. At 1508, the relay WTRU may send a direct communication accept (DCA) message (e.g., including a pending secondary A&A indication) and configure a traffic filter associated with the connection (e.g., a PC5 link) to discard data traffic from the remote WTRU until a successful completion of the secondary A&A. At 1510, the relay WTRU may send a request message (e.g., access stratum (NAS) request message) to a session management function (SMF) (e.g., including a remote WTRU ID) to initiate the connectivity session secondary A&A for the remote WTRU. The relay may forward EAP authentication message(s) between the WTRU and an AMF and/or SMF transparently (e.g., NAS message(s) may include the remote WTRU ID to indicate the EAP messages are to authenticate the remote WTRU). At 1512, the relay WTRU may transmit secondary AA authentication message(s) between the SMF and the remote WTRU. At 1514, the relay WTRU may receive an NAS response message from the SMF including a successful A&A indication, an EAP success message, and/or remote WTRU authorization information (e.g., DN-allocated IP address and/or DN-assigned session aggregate maximum bit rate (AMBR)). At 1516, the relay WTRU, e.g., based on success, may configure the link traffic filter to authorize data traffic between the remote WTRU and the network/DN and may inform the remote WTRU including an EAP success message in a link modification procedure. At 1518, the relay WTRU may relay data traffic between the remote WTRU and the network and/or DN. FIG. 16 illustrates an example 1600 of a link setup with a relay using S-NSSAI subject to NSSAA. At 1602, a relay WTRU may receive a DCR from a remote WTRU, for example, including a remote WTRU's identity (e.g., SUCI), S-NSSAI, and/or the remote WTRU's NSSAA capabilities. At 1604, the relay WTRU may determine that the S-NSSAI used by the ProSe connection (e.g., PC5 connection) is subject to NSSAA, for example, based on a local ProSe configuration and/or a prior NSSAA performed by the relay for that S-NSSAI. At 1606, the relay WTRU may send an NAS request message to an AMF including the remote WTRU identity, requested S-NSSAI, and/or the remote WTRU's NSSAA capabilities to initiate the network-controlled authorization of the remote WTRU. The relay WTRU may transmit primary authentication message(s) between the AMF and the remote WTRU. At 1608, the relay WTRU may receive a response message (e.g., an NAS response message) including Key material that may be bound to the S-NSSAI, a remote WTRU ID, an NSSAA status indication (e.g., one of success, pending or required), and/or the S-NSSAI. At 1610, the relay WTRU may send a direct security mode command (DSMC) message to the remote WTRU that includes the NSSAA status indication and/or the S-NSSAI. A NSSAA procedure may be triggered by the relay WTRU (e.g., via a NAS request) or the AMF. At 1612, the relay WTRU may transmit NSSAA authentication message(s) between the AMF and the remote WTRU. At 1614, the relay WTRU may receive an NAS message from the AMF that includes a remote WTRU ID, a NSSAA result, and/or the S-NSSAI. The relay may store the S-NSSAI as allowed for the remote WTRU. At 1616, the relay WTRU may send a ProSe (e.g., PC5) message (e.g., link modification request) including a successful NSSAA indication and/or the S-NSSAI. At 1618, the relay WTRU may allow the remote WTRU to use the S-NSSAI (e.g., with the connectivity session using the S-NSSAI). A connection may be established via a relay WTRU using a remote WTRU's identity (e.g., a GUTI, which may be a 5G GUTI).

In examples described herein, a remote WTRU and/or a relay WTRU may determine whether the remote WTRU's security context (e.g., the remote WTRU's security context, which may be a 5G native security context) may be used with the relay WTRU's serving PLMN.

FIG. 17 illustrates an example where a remote WTRU may determine whether to use the remote WTRU's identity (e.g., a GUTI, which may be a 5G GUTI) based on PLMN information received during a discovery procedure (e.g., a discovery procedure with a relay WTRU).

In examples described with respect to FIG. 17, the remote WTRU may determine whether the remote WTRU may use the remote WTRU's identity (e.g., the remote WTRU's GUTI, which may be a 5G GUTI) to connect via the relay WTRU.

At 1702, the remote WTRU may receive the relay WTRU's serving network ID (e.g., PLMN ID) via a discovery message from the relay WTRU during a discovery procedure. The discovery message may include information indicating the relay WTRU's serving PLMN ID. The relay WTRU may broadcast its PLMN ID along with a service code that the relay WTRU provides (e.g., using ProSe discovery Model A). The relay WTRU may send a response message including the relay WTRU's PLMN ID in response to a message (e.g., a solicitation message and/or a request message) from the remote WTRU (e.g., using ProSe discovery Model B).

At 1704, the remote WTRU may determine if the remote WTRU has a security context, which may be a 5G native context, established with the relay's WTRU serving PLMN, for example, by matching the PLMN ID part of the GUTI (e.g., 5G GUTI) with the PLMN ID received from the relay WTRU. The remote WTRU may evaluate or determine (e.g., check to determine) whether the received relay WTRU's serving PLMN ID matches the PLMN ID part of the remote WTRU's GUTI (e.g., 5G GUTI). In examples, a GUTI may include a PLMN ID (e.g., PLMN ID part), an AMF ID (e.g., an AMF ID part), and/or an S-temporary mobile subscriber identity (S-TMSI) (e.g., an S-TMSI part). The received relay WTRU's serving PLMN ID may match the PLMN ID part of the remote WTRU's GUTI (e.g., 5G GUTI) if the received relay WTRU's serving PLMN ID is equal to the PLMN ID that is a part of the GUTI.

At 1706, if a match is found for the received relay WTRU's serving PLMN ID, the remote WTRU may send a message (e.g., a DCR message) to the relay WTRU. The message may include the remote WTRU's identifier (e.g., 5G GUTI) associated with the received relay WTRU's serving PLMN ID, for example, the remote WTRU's corresponding 5G GUTI. The remote WTRU may connect via the relay WTRU (e.g., proceed with a connection via the relay) using the security context, which may be a 5G native security context, associated with the remote WTRU's identifier (e.g., the 5G GUTI) as illustrated in one or more examples herein. If a match is not found, the remote WTRU may send a different remote WTRU's identifier (e.g., the remote WTRU's SUCI) via the DCR message, and/or the remote WTRU may not send the remote WTRU's GUTI (e.g., a 5G GUTI).

FIG. 18 illustrates an example where a relay WTRU may determine whether to use a remote WTRU's identifier (e.g., 5G GUTI) received during a link establishment procedure (e.g., a remote WTRU's identifier received in a DCR).

In examples described with respect to FIG. 18, a relay WTRU may determine whether the remote WTRU's identifier (e.g., 5G GUTI) provided by the remote WTRU via a DCR message may be used to connect via the relay WTRU.

At 1802, the relay WTRU may receive a message (e.g., a first DCR message) from the remote WTRU. The message may include the remote WTRU's identifier (e.g., 5G GUTI).

At 1804, the relay WTRU may evaluate and/or determine (e.g., check to determine) whether the relay WTRU's serving network ID (e.g., the relay WTRU's own serving PLMN ID) matches the PLMN ID part of the remote WTRU's identifier (e.g., 5G GUTI).

At 1806, if a match is found for the relay WTRU's serving network ID (e.g., the PLMN ID), the relay WTRU may perform (e.g., proceed to perform) a connection procedure (e.g., a network-controlled authorization procedure with the network (e.g., AMF)) using the remote WTRU's security context, which may be a 5G native security context, for example, as described herein. If a match is not found for the relay WTRU's serving network ID (e.g., the PLMN ID), the relay WTRU may reject the remote WTRU's connection request, and/or the relay WTRU may indicate the cause of rejection (e.g., that the provided 5G GUTI is not valid for the relay's serving PLMN). If the relay WTRU rejects the remote WTRU's connection request, the remote WTRU may send a second DCR (e.g., a new DCR) message. The second DCR message may include a different remote WTRU's identifier (e.g., the remote WTRU's SUCI) and/or may not include the remote WTRU's identifier, which may be a GUTI, such as a 5G GUTI.

FIG. 19 illustrates an example where a relay WTRU may determine whether to use a remote WTRU's identifier (e.g., 5G GUTI) received during a link establishment procedure (e.g., a remote WTRU's identifier received associated with an identity request).

In examples described with respect to in FIG. 19, the relay WTRU may determine whether the remote WTRU's identifier (e.g., 5G GUTI) provided by the remote WTRU in an identity response message may be used to connect via the relay WTRU.

At 1902, the relay WTRU may receive a DCR message from a remote WTRU for a connectivity service (e.g., a connectivity service requiring a network-controlled authorization). The DCR message may not include a (e.g., any) remote WTRU's identity (e.g., the remote WTRU's network identity such as a SUCI or a 5G GUTI). The relay WTRU may determine that a remote WTRU's identity (e.g., the remote WTRU's network identity) is to be used and/or requested to connect via the relay WTRU (e.g., if a network-controlled authorization is requested for the connectivity service provided as shown in one or more examples herein).

At 1904, the relay WTRU may send the remote WTRU an identity request message. The identity request message may include the relay WTRU's serving network ID (e.g., PLMN ID) and/or an indication for the remote WTRU to provide the remote WTRU's identity (e.g., the remote WTRU's network identity).

The remote WTRU may evaluate and/or determine (e.g., check to determine) whether the received relay WTRU's serving PLMN ID matches the PLMN ID part of the remote WTRU's identifier (e.g., the remote WTRU's 5G GUTI). The remote WTRU may send the remote WTRU's identifier (e.g., a GUTI, such as a 5G GUTI) if a match is found. The remote WTRU may send the remote WTRU's SUCI if a match is not found.

At 1906, the relay WTRU may receive an identity response message. The identity response message may include the remote WTRU's identifier (e.g., 5G GUTI).

At 1908, the relay WTRU may evaluate and/or determine (e.g., check to determine) if the PLMN ID part of the remote WTRU's identity (e.g., 5G GUTI) matches the relay WTRU's serving PLMN ID. At 1910, if a match is found, the relay WTRU may perform (e.g., proceed with) the connection procedure with the network (e.g., AMF) using the remote WTRU's 5G native security context, for example, as illustrated in one or more examples herein. For example, the connection procedure may include a network-controlled authorization procedure. If a match is not found for the PLMN ID, the relay WTRU may reject the remote WTRU's connection request and/or indicate the cause of rejection (e.g., that the provided 5G GUTI is not valid for the relay's serving PLMN). If the identity response message includes the remote WTRU's SUCI, the relay WTRU may perform (e.g., proceed to perform) the connection procedure using the remote WTRU's SUCI, for example, as illustrated in one or more examples herein.

Relay traffic filtering towards N3IWF may be performed for remote WTRU authentication and authorization to access network resources (e.g., PDU session(s)/slice(s)).

A relay provisioned with RSC that uses N3IWF access may determine to enforce restricted connectivity for a remote WTRU to be able to establish an IPSec connection with N3IWF, during a PC5 link establishment procedure with the remote WTRU requesting the RSC. The relay WTRU may decide to select an N3IWF in the relay's serving PLMN based on N3IWF selection procedure(s) (e.g., based on PLMN ID, Tracking Area Identity). In examples, a remote WTRU may decide to select an N3IWF in the remote WTRU's HPLMN based on the remote WTRU's N3IWF identifier configuration (e.g., FQDN or IP address of the N3IWF in the HPLMN).

A relay WTRU's behavior(s) (e.g., using N3IWF in relay's serving PLMN) may include one or more of the following.

The relay WTRU may receive a connection request (e.g., a PC5 connection request message) including an RSC that requests N3IWF access and an indication to use a local N3IWF (e.g., an indication that the remote WTRU wishes to use a local N3IWF).

The relay WTRU may determine the IP address of a local N3IWF in the relay's serving PLMN, for example, using an N3IWF selection procedure similar to that used by the remote WTRU, which may use the serving PLMN ID and/or the TAI corresponding to the serving cell.

The relay WTRU may establish a connectivity session (e.g., PDU session) to enable communications between the remote WTRU and the local N3IWF (e.g., if not established).

The relay WTRU may provide the remote WTRU with the PLMN ID and TAJ in a connection response (e.g., the PC5 connection response message), for example, to assist the remote WTRU with the N3IWF selection procedure. In some examples, the relay WTRU may provide the remote WTRU with the IP address or FQDN for the local N3IWF as selected by the relay WTRU in the above.

The relay WTRU may assign IPv6 prefix or Ipv4 address for the remote WTRU and/or configure a traffic filter (e.g., a traffic filter for the PC5 link to only allow traffic between the remote WTRU and local N3IWF).

The relay WTRU's behavior(s) (e.g., using N3IWF in a remote WTRU's HPLMN) may include one or more of the following.

The relay WTRU may receive a connection request (e.g., a PC5 connection request message) including an RSC that requests N3IWF and an indication that the remote WTRU wishes to use a remote WTRU's HPLMN N3IWF (e.g., including FQDN or IP address of N3IWF in the remote WTRU's HPLMN) and the remote WTRU's HPLMN ID.

The relay WTRU may verify that the provided N3IWF address corresponds to a valid operator identifier based N3IWF FQDN (e.g., n3iwf.5gc.mnc<MNC>.moc<MCC>.pub.3gppnetwork.org), where MNC and/or MCC match the remote WTRU's HPLMN ID. The relay WTRU may verify that using N3IWF in the remote WTRU's HPLMN is authorized for the remote WTRU if HPLMN ID is part of a configured list of PLMN (e.g., associated with the requested RSC).

The relay WTRU may establish a connectivity session (e.g., a PDU session) to enable communications between the remote WTRU and the N3IWF (e.g., if not established).

The relay WTRU may assign IPv6 prefix or IPv4 address for the remote WTRU and/or configure a traffic filter (e.g., a traffic filter for the PC5 link to only allow traffic between the remote WTRU and N3IWF in the remote WTRU's HPLMN).

A relay wireless transmit/receive unit (WTRU) may be provided. The WTRU may comprise a processor. The processor may be configured to perform a number of actions. A request for a connectivity session associated with a network may be received from a remote WTRU. It may be determined that the connectivity session associated with the network is subject to a network-controlled authorization. A request message may be sent to the network to trigger the network-controlled authorization. An authentication message may be received from the network. The authentication message may be sent to the remote WTRU.

In an example, a response message may be received from the network that indicates a status of the network-controlled authorization. An indication of the status of the network-controlled authorization may be sent to the remote WTRU. A traffic filter to authorize/unauthorize data traffic from the remote WTRU may be determined. The traffic filter may be applied on the data traffic.

In an example, it may be determined that a single-network slice selection assistance information (S-NSSAI) associated with the connectivity session may be subject to a network slice-specific authentication and authorization (NSSAA). A response message may be received from the network. The response message may comprise the S-NSSAI and/or an indication of an NSSAA status. A direct communication accept (DCA) message may be sent to the remote WTRU. The DCA message may comprises the S-NSSAI and the indication of the NSSAA status.

In an example, a non-access stratum (NAS) message may be received from the network. The NAS message may comprise the S-NSSAI and/or an indication of an outcome of the NSSAA. On a condition that the outcome of the NSSAA is successful, the S-NSSAI may be stored, and a message may be sent to the network. The message sent to the network may comprise the S-NSSAI and an identifier of the remote WTRU.

In an example, the request for the connectivity session may comprises a globally unique temporary identifier (GUTI) associated with the remote WTRU. It may be determined whether a serving public land mobile network (PLMN) ID associated with the relay WTRU matches a PLMN ID part of the GUTI. A network-controlled authorization for the remote WTRU may be triggered using the GUTI associated with the remote WTRU if the serving PLMN ID associated with the relay WTRU matches the PLMN ID part of the GUTI.

In an example, an identity request message may be sent. The identify request message may comprise the serving PLMN ID associated with the relay WTRU and/or an indication for requesting an identity of the remote WTRU.

An identity response message may be received from the remote WTRU. The identity response message may comprise the GUTI of the remote WTRU.

In an example, a relay service code (RSC) and an indication to connect with a non-3GPP interworking function (N3IWF) may be received. The N3IWF may be identified. A IPv6 prefix or IPv4 address may be assigned for the remote WTRU. A traffic filter may be configured to authorize traffic between the remote WTRU and the N3IWF.

In an example, an indication of a type of N3IWF may be received. The type of N3IWF may comprise a local N3IWF and/or a home visited public land mobile network (HPLMN) N3IWF of the remote WTRU.

In an example, the traffic filter may authorize traffic between the remote WTRU and the N3IWF.

If the ProSe connection (e.g., PC5 connection) is established, the relay WTRU may allow traffic between the remote WTRU and N3IWF to establish an IPSec connection and to enable the remote WTRU to perform NAS registration (e.g., including NSSAA) and a connectivity session establishment (e.g., a PDU session establishment including the secondary authentication) via the relay/N3IWF.

In examples, a first WTRU may receive a first message from a second WTRU. The first message may indicate a request for a data session associated with a data network. The first WTRU may send a second message to the second WTRU, for example, if a primary authentication associated with the second WTRU is successful. The second message may indicate that a secondary authentication associated with the second WTRU is pending. The first WTRU may receive a third message from the data network. The third message may indicate that the secondary authentication associated with the second WTRU is successful and that the second WTRU has been granted access to the data session. The first WTRU may send a fourth message to the second WTRU, for example, if the secondary authentication is successful. The first message may be associated with the data session.

In examples, the first message may indicate one or more of the following: an identity of the first WTRU or a capability associated with an authentication service. The second message may indicate one or more of the following: an authentication service, an identity associated with the authentication service, or an identity of a server that provides the authentication service. The third message may indicate one or more of the following: a user identification, data associated with an authentication protocol, authorization information for the data session, or data associated with a link modification procedure. The fourth message may indicate a service identification. The first WTRU may determine that the second WTRU is to be subjected to the primary authentication and that access to the data session is to be subjected to a secondary authentication. The first WTRU may send a fifth message to the second WTRU. The fifth message may indicate a request for the second WTRU to perform a procedure associated with the primary authentication. In examples, the first WTRU may send a sixth message to the second WTRU. The sixth message may indicate a request for the second WTRU to perform a procedure associated with the secondary authentication. The first WTRU may send authentication data to the network. The authentication data may be received from the second WTRU in response to the sixth message.

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

What is claimed is:

1. A method performed by a first wireless transmit/receive unit (WTRU) for authenticating a second WTRU, the method comprising:
   receiving a first message from the second WTRU, wherein the first message from the second WTRU indicates a request for a protocol data unit (PDU) session associated with a data network;
   determining, based on the request for the PDU session, that the second WTRU is subject to a network authentication and a secondary authentication;
   sending a second message to the second WTRU based on the network authentication associated with the second WTRU being successful, wherein the second message to the second WTRU indicates that the secondary authentication associated with the second WTRU is pending;
   configuring a traffic filter to prevent data traffic between the second WTRU and the data network;
   receiving a message from a network node, wherein the message from the network node comprises an indication that the secondary authentication is successful;
   on condition that the secondary authentication is successful, determining that the second WTRU has been granted access to the PDU session and updating the traffic filter to allow the data traffic between the second WTRU and the data network; and
   sending a third message to the second WTRU based on the second WTRU being granted access to the PDU session, wherein the third message to the second WTRU is associated with the PDU session.

2. The method of claim 1, wherein the first message from the second WTRU further indicates at least one of an identity of the first WTRU or a capability associated with an authentication service.

3. The method of claim 1, wherein the second message to the second WTRU indicates at least one of an authentication service or an identity associated with the authentication service.

4. The method of claim 1, wherein the message from the network node further indicates at least one of a user identification, data associated with an authentication protocol, or authentication information for the PDU session.

5. The method of claim 1, wherein the third message to the second WTRU further indicates a service identification.

6. The method of claim 1, wherein the method further comprises sending a fourth message to the second WTRU, wherein the fourth message to the second WTRU indicates a request for the second WTRU to perform a procedure associated with the network authentication.

7. The method of claim 1, wherein the method further comprises sending a fifth message to the second WTRU, wherein the fifth message to the second WTRU indicates a request for the second WTRU to perform a procedure associated with the secondary authentication.

8. The method of claim 7, wherein the method further comprises sending authentication data to the network node, wherein the authentication data is received from the second WTRU in response to the fifth message to the second WTRU.

9. A first wireless transmit/receive unit (WTRU), the first WTRU comprising:

a processor configured to:

receive a first message from a second WTRU, wherein the first message from the second WTRU indicates a request for a protocol data unit (PDU) session associated with a data network;

determine, based on the request for the PDU session, that the second WTRU is subject to a network authentication and a secondary authentication;

send a second message to the second WTRU based on the network authentication associated with the second WTRU being successful, wherein the second message to the second WTRU indicates that the secondary authentication associated with the second WTRU is pending;

configure a traffic filter to prevent data traffic between the second WTRU and the data network;

receive a message from a network node, wherein the message from the network node comprises an indication that the secondary authentication is successful;

on condition that the secondary authentication is successful, determine that the second WTRU has been granted access to the PDU session and update the traffic filter to allow the data traffic between the second WTRU and the data network; and send a third message to the second WTRU based on the second WTRU being granted access to the PDU session, wherein the third message to the second WTRU is associated with the PDU session.

10. The WTRU of claim 9, wherein the first message from the second WTRU further indicates at least one of an identity of the first WTRU or a capability associated with an authentication service.

11. The WTRU of claim 9, wherein the second message to the second WTRU indicates at least one of an authentication service or an identity associated with the authentication service.

12. The WTRU of claim 9, wherein the message from the network node further indicates at least one of a user identification, data associated with an authentication protocol, or authentication information for the PDU session.

13. The WTRU of claim 9, wherein the third message to the second WTRU further indicates a service identification.

14. The WTRU of claim 9, wherein the processor is further configured to send a fourth message to the second WTRU, wherein the fourth message to the second WTRU indicates a request for the second WTRU to perform a procedure associated with the network authentication.

15. The WTRU of claim 9, wherein the processor is further configured to send a fifth message to the second WTRU, wherein the fifth message to the second WTRU indicates a request for the second WTRU to perform a procedure associated with the secondary authentication.

16. The WTRU of claim 15, wherein the processor is further configured to send authentication data to the network node, wherein the authentication data is received from the second WTRU in response to the fifth message to the second WTRU.

* * * * *